(12) United States Patent
Yokoi

(10) Patent No.: US 7,389,758 B2
(45) Date of Patent: Jun. 24, 2008

(54) ENGINE AIR INTAKE ARRANGEMENT FOR A VEHICLE

(75) Inventor: Masato Yokoi, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 11/623,698

(22) Filed: Jan. 16, 2007

(65) Prior Publication Data

US 2007/0175430 A1    Aug. 2, 2007

(30) Foreign Application Priority Data

| Jan. 17, 2006 | (JP) | ............................... 2006-009139 |
| Sep. 20, 2006 | (JP) | ............................... 2006-253642 |

(51) Int. Cl.
    *F02M 35/10*    (2006.01)
(52) U.S. Cl. ............................... 123/184.55; 123/184.53
(58) Field of Classification Search ............. 123/184.55
    See application file for complete search history.

(56) References Cited

U.S. PATENT DOCUMENTS

| 4,543,918 | A | * | 10/1985 | Ma | ....................... 123/184.42 |
| 4,759,320 | A |   | 7/1988  | Fujii et al. | |
| 4,890,586 | A | * | 1/1990  | Fujii et al. | ............. 123/184.55 |
| 5,740,770 | A |   | 4/1998  | Morota | |
| 6,408,810 | B1 |  | 6/2002  | Leipelt et al. | |

FOREIGN PATENT DOCUMENTS

| JP | 63-177627 | 11/1988 |
| JP | 02-223632 | 9/1990 |
| JP | 09-100720 | 4/1997 |

* cited by examiner

*Primary Examiner*—Noah Kamen
(74) *Attorney, Agent, or Firm*—Knobbe, Martens, Olson & Bear LLP

(57) ABSTRACT

A vehicle, such as a motorcycle, that includes an engine air intake arrangement with a variable length intake passage. The motorcycle includes an engine having an intake port. A fixed funnel delivers air to the intake port of the engine. A moveable funnel is positioned on the intake side of the fixed funnel and selectively cooperates with the fixed funnel to deliver air to the intake port of the engine. A parallel linkage moveably supports the moveable funnel relative to the fixed funnel. An air cleaner box, in which the fixed funnel and the moveable funnel are disposed, includes a protrusion at a portion that covers the moveable funnel and that prevents the occurrence of contact with the moveable funnel.

18 Claims, 19 Drawing Sheets

[Fig. 1]
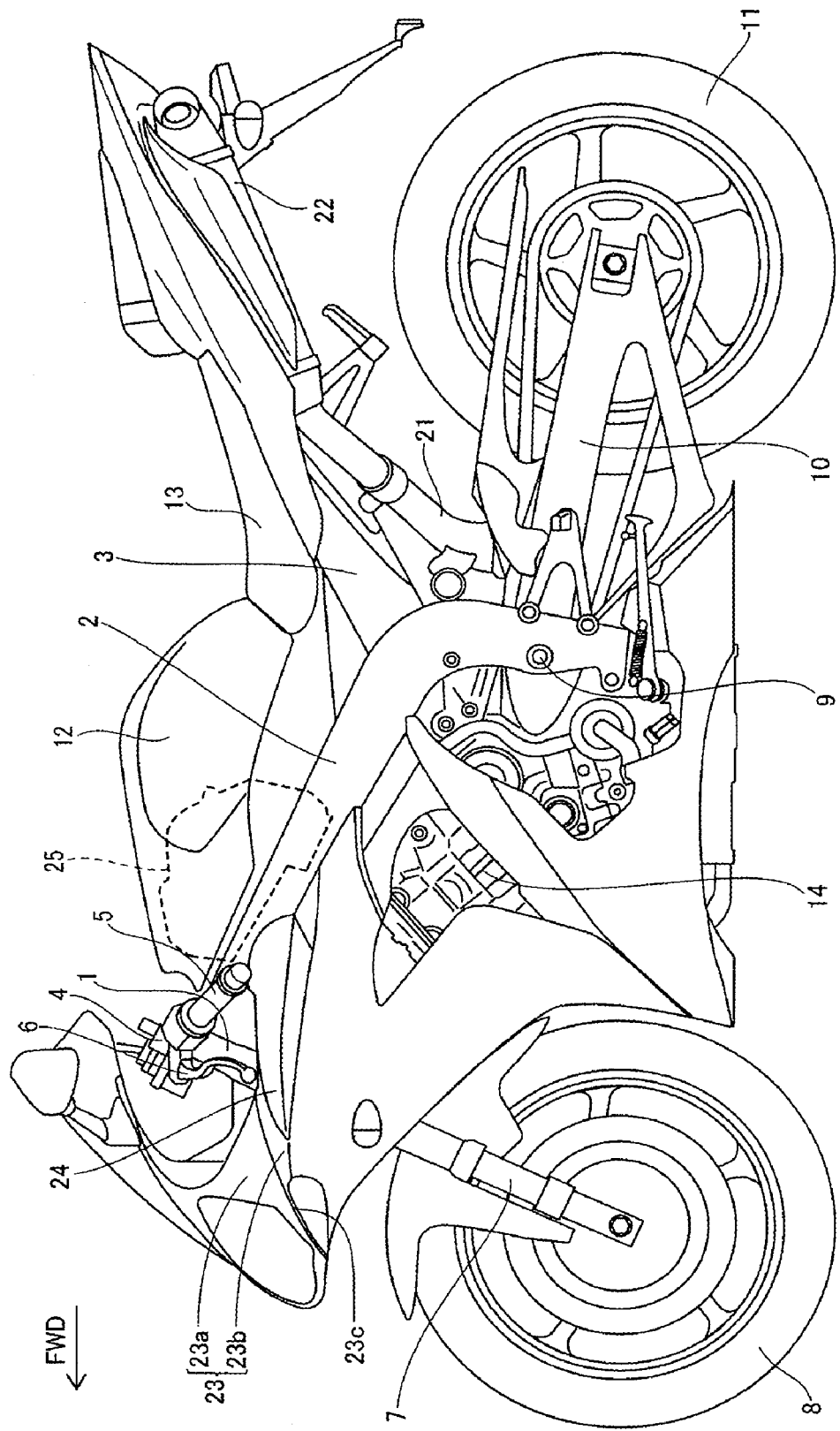

[Fig. 2]
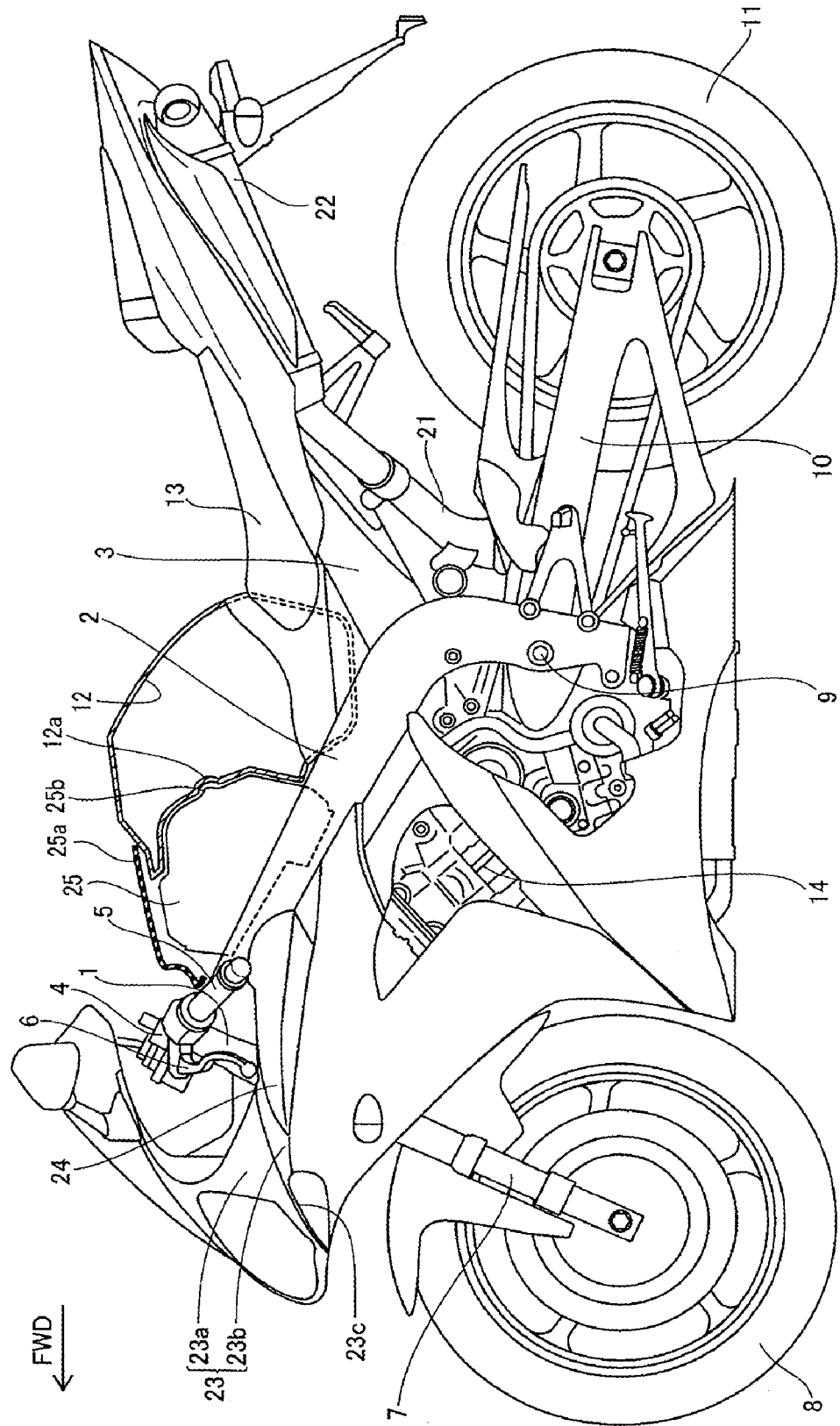

[Fig. 3]
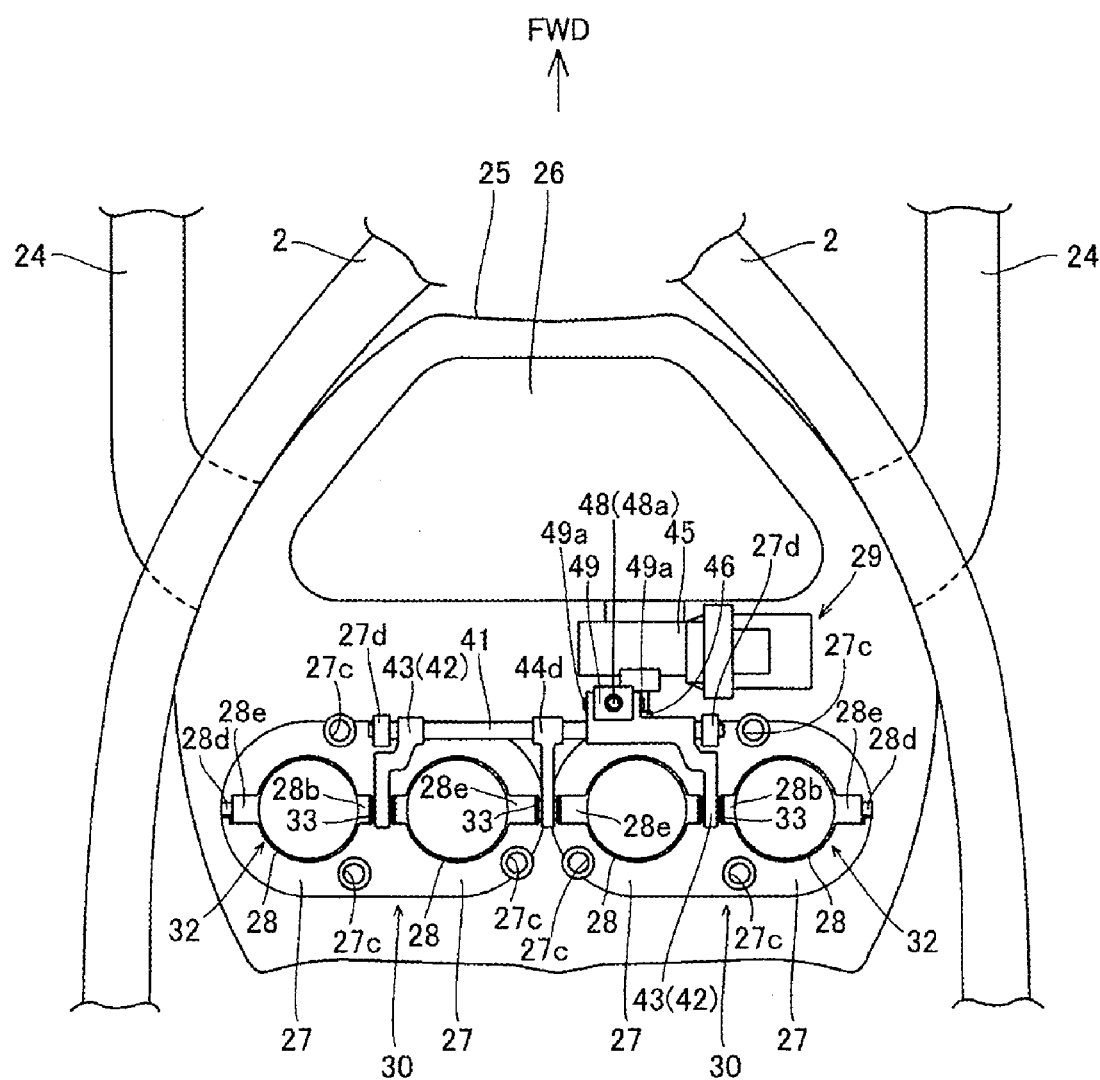

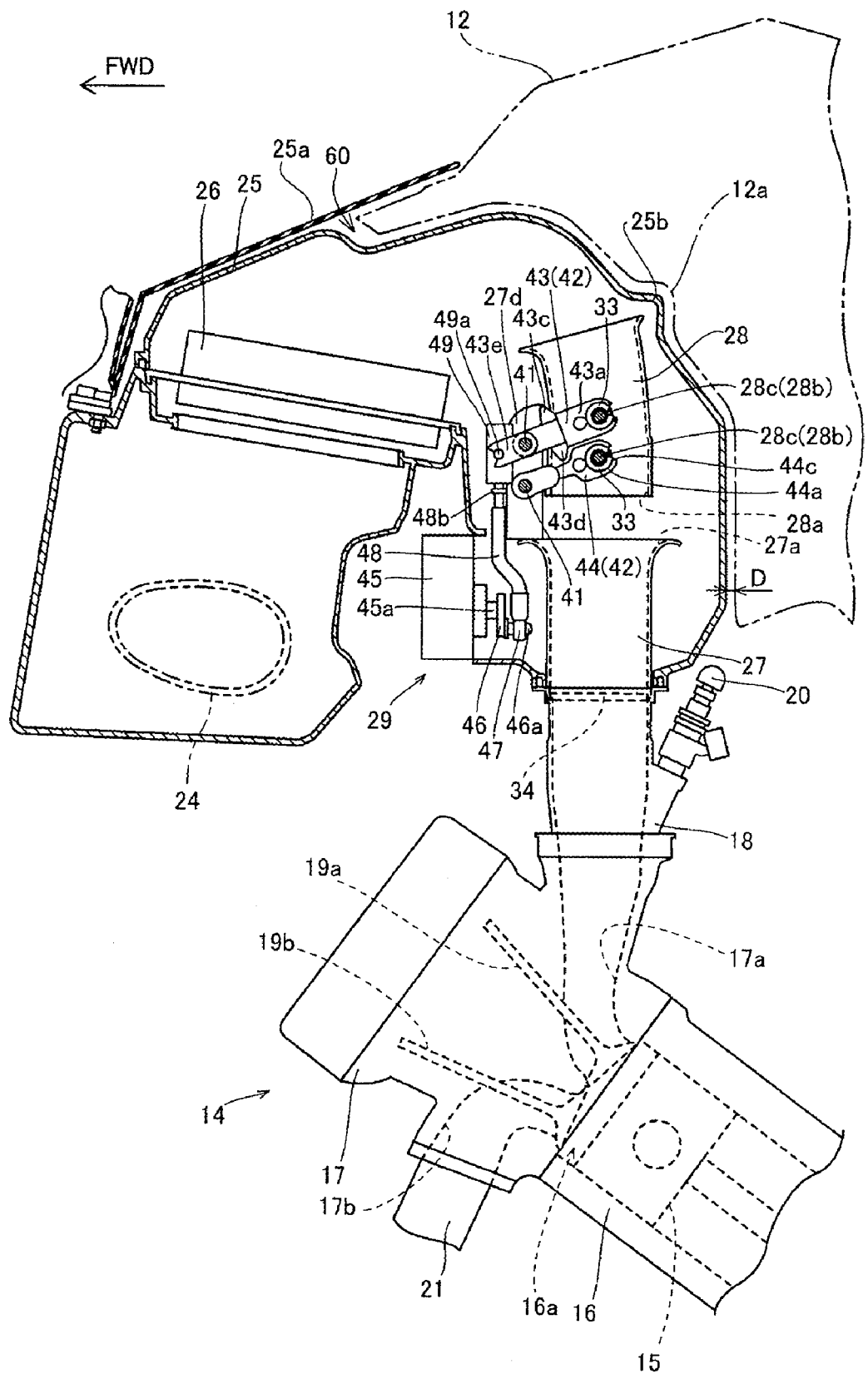

[Fig. 5]
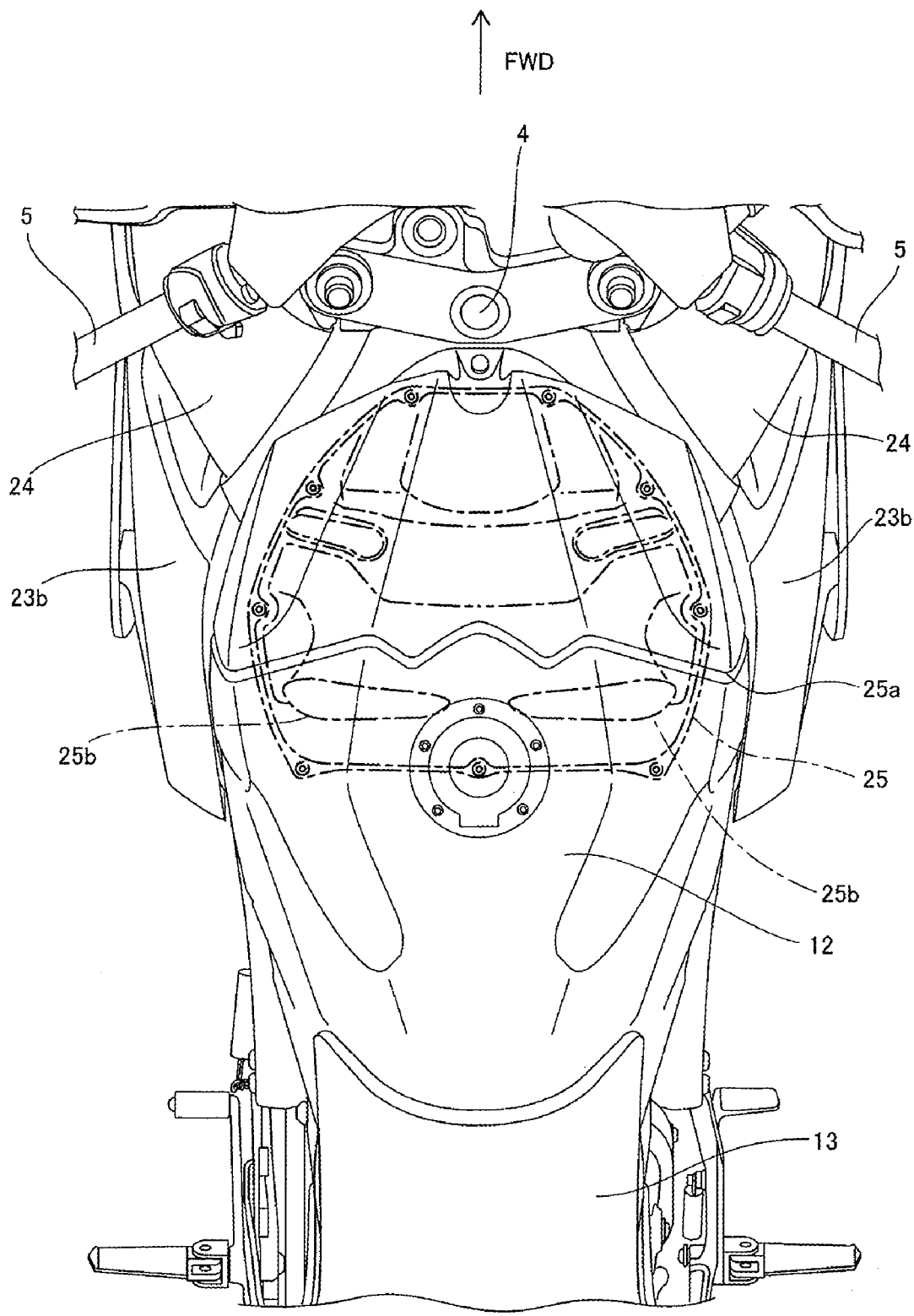

[Fig. 6]
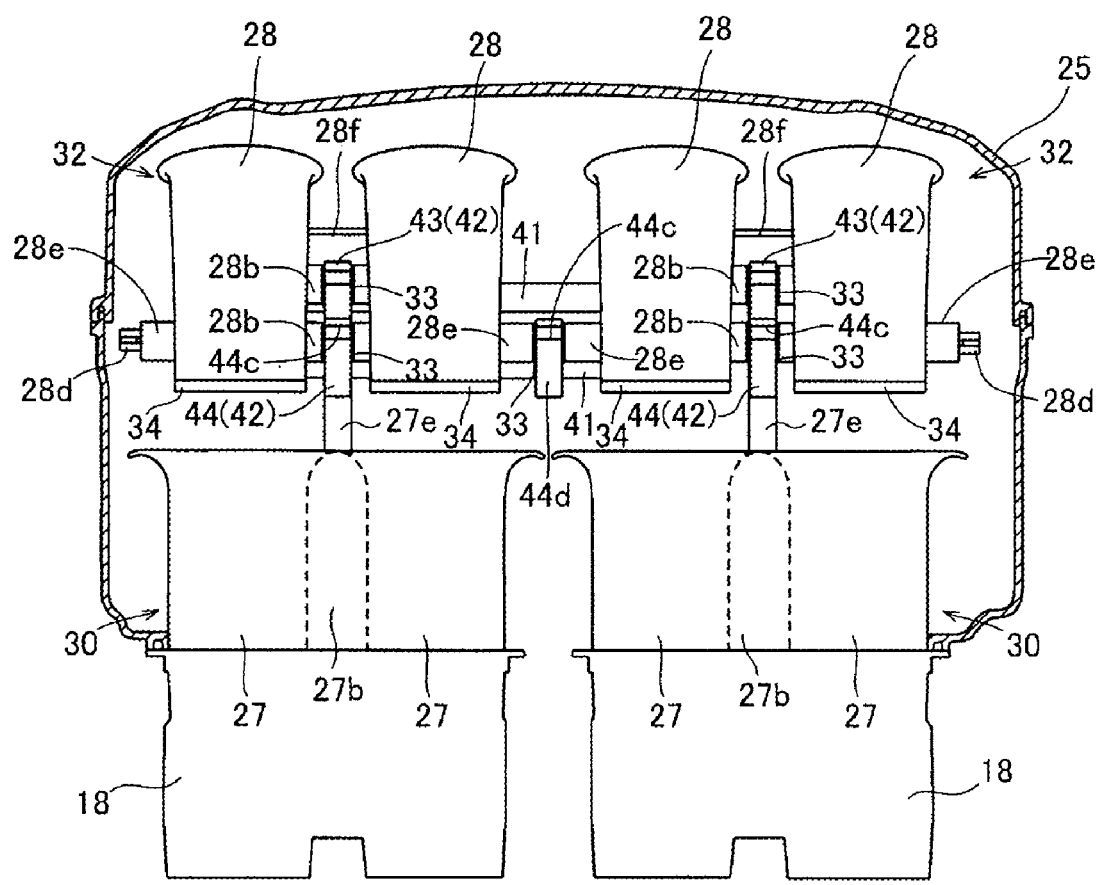

[Fig. 7]
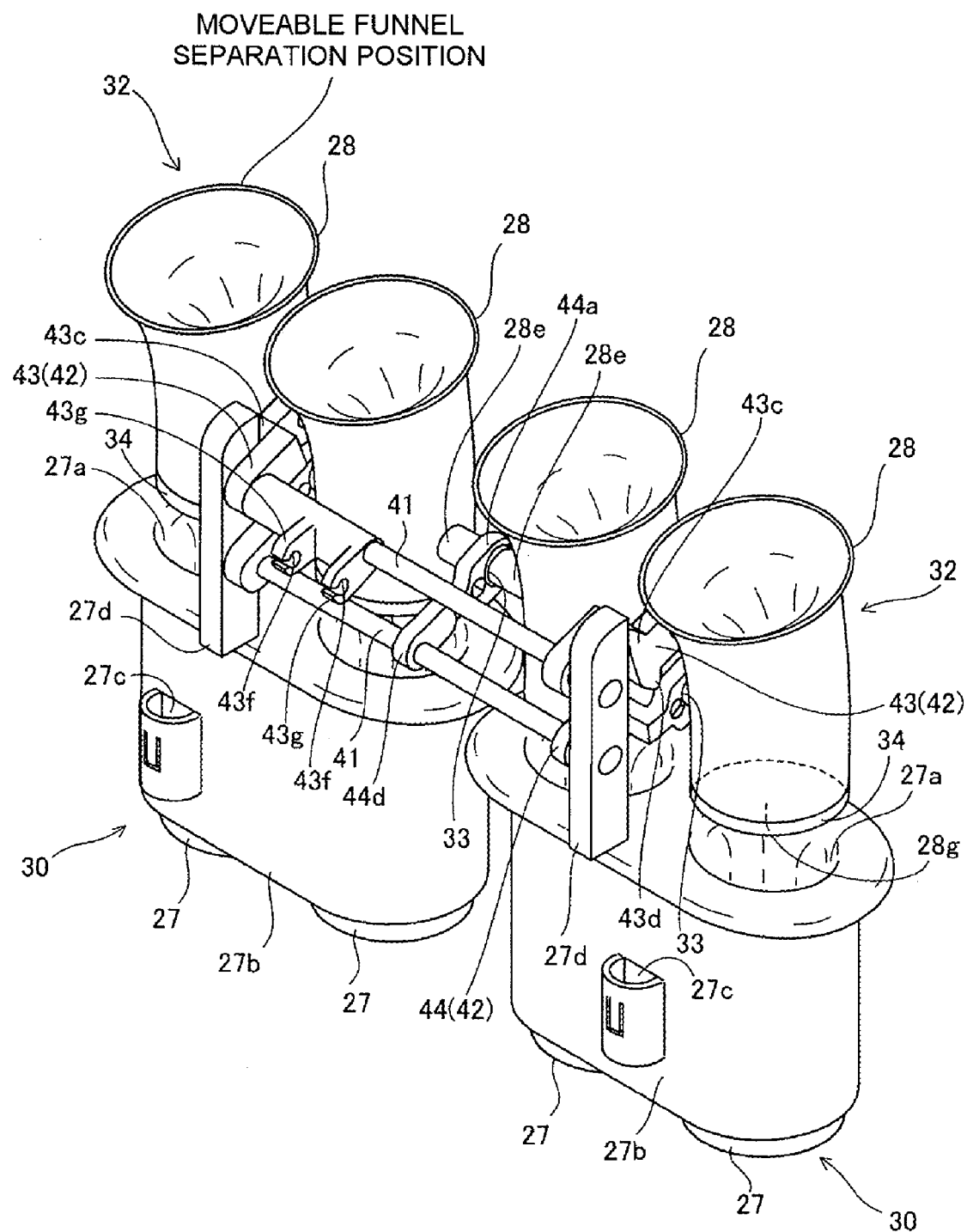

[Fig. 8]
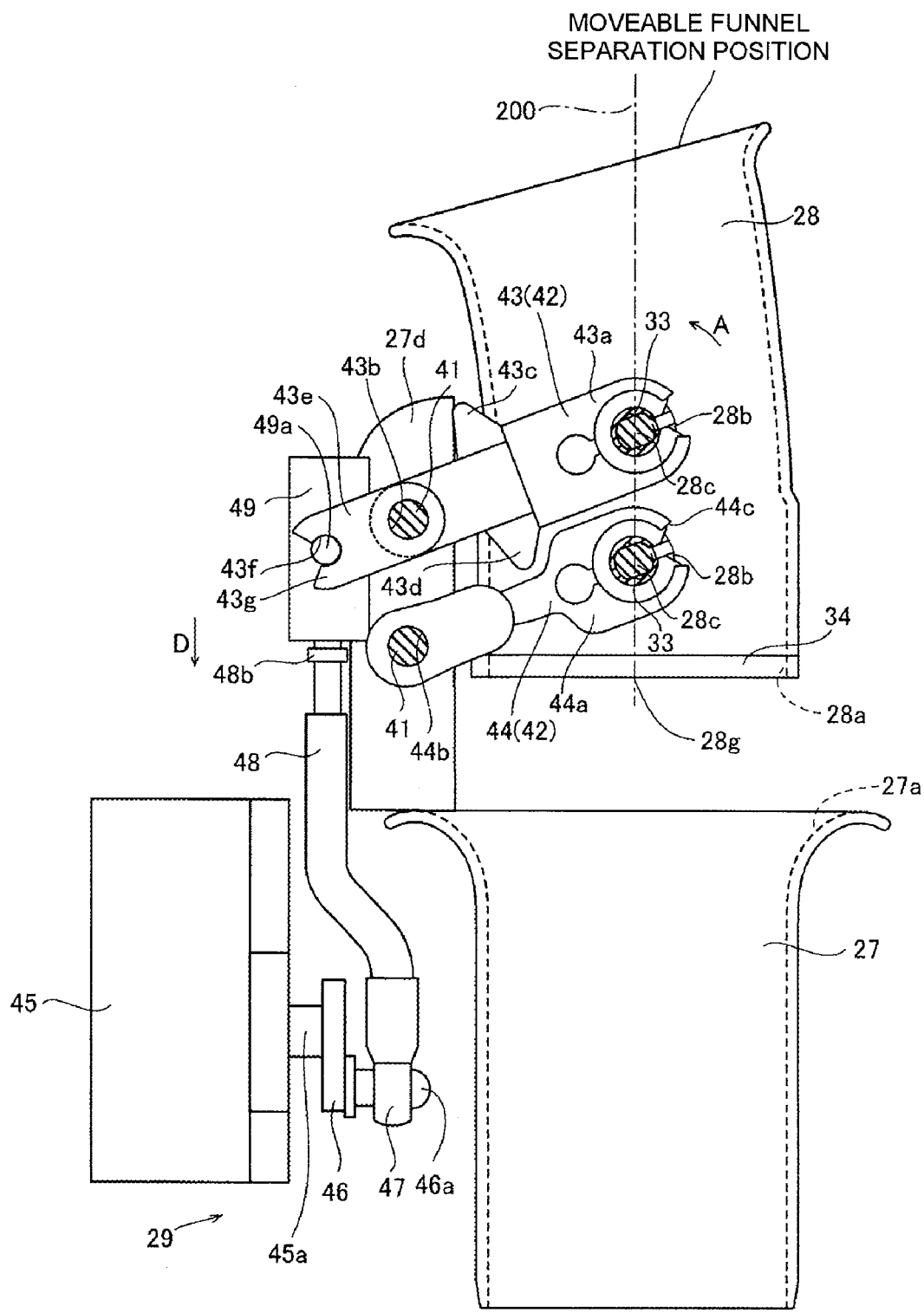

[Fig. 9]
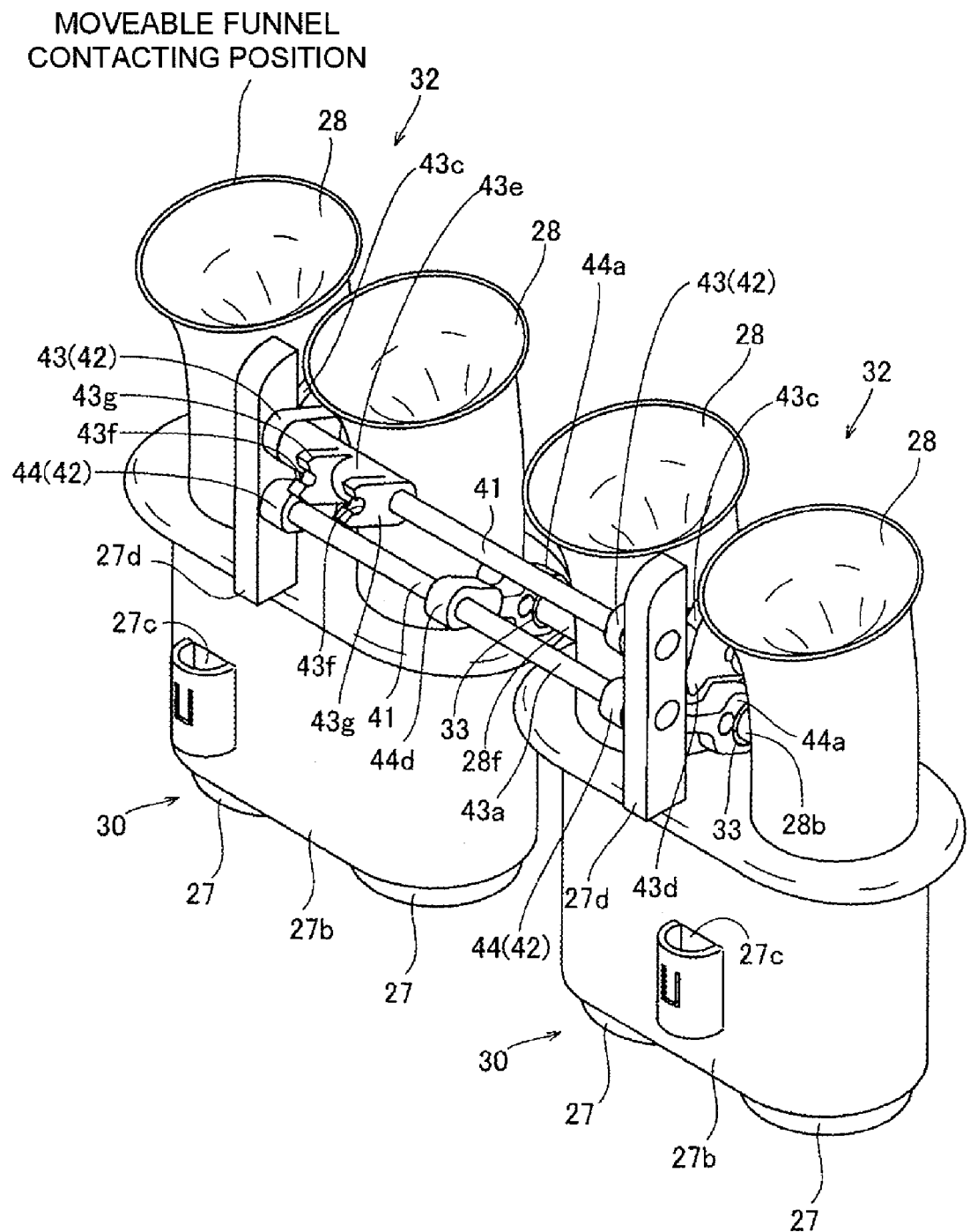

[Fig. 10]
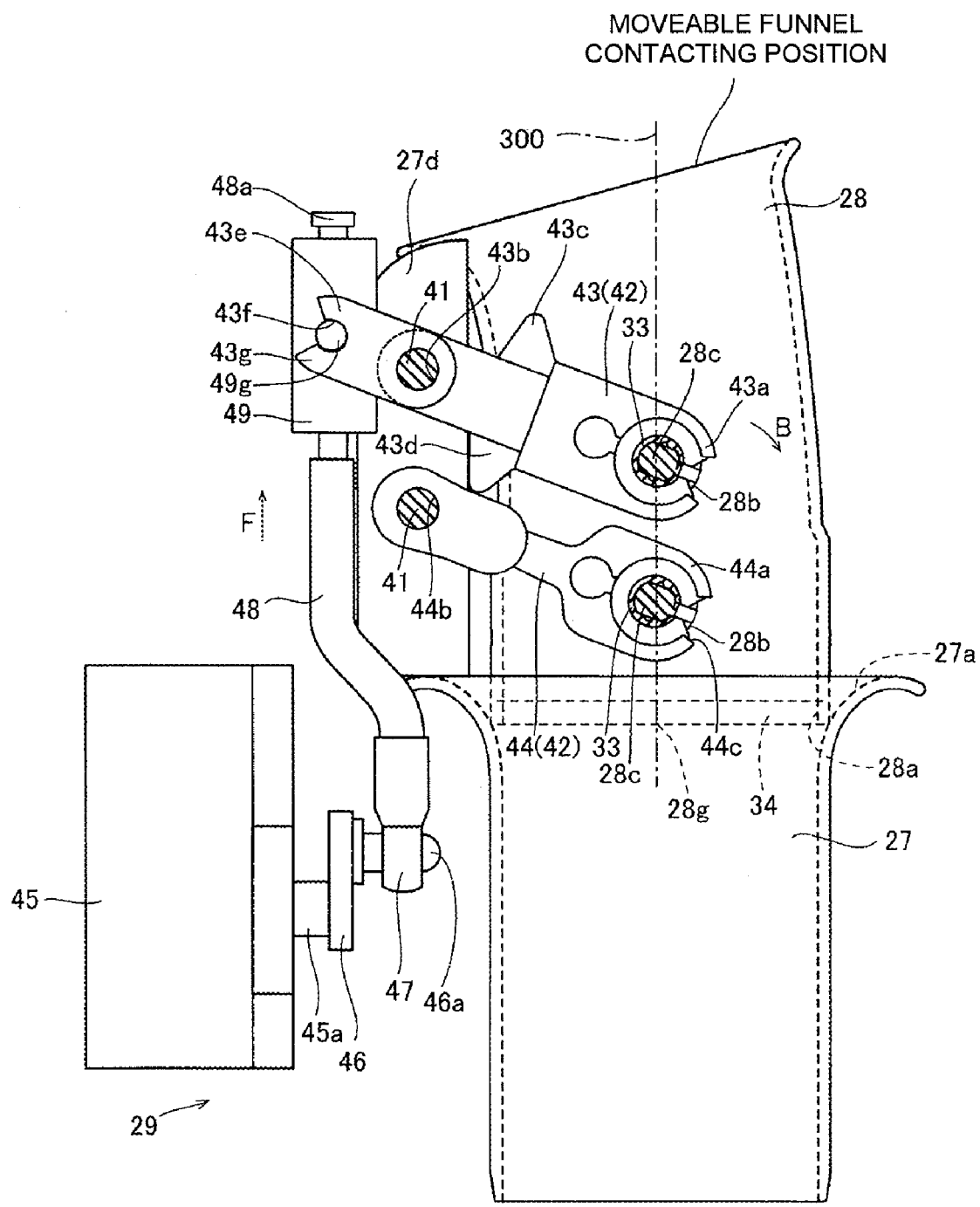

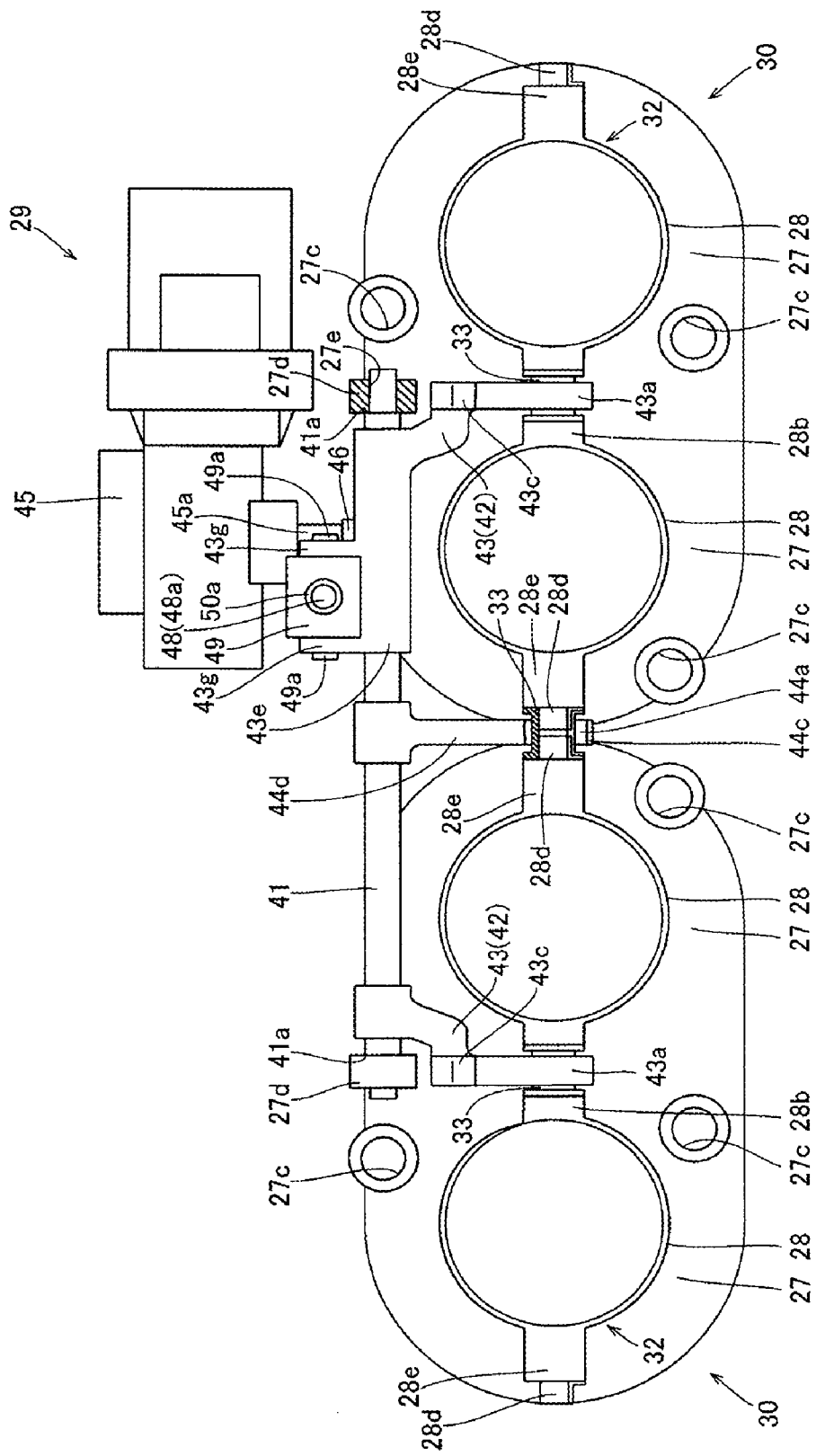
[Fig. 11]

[Fig. 12]
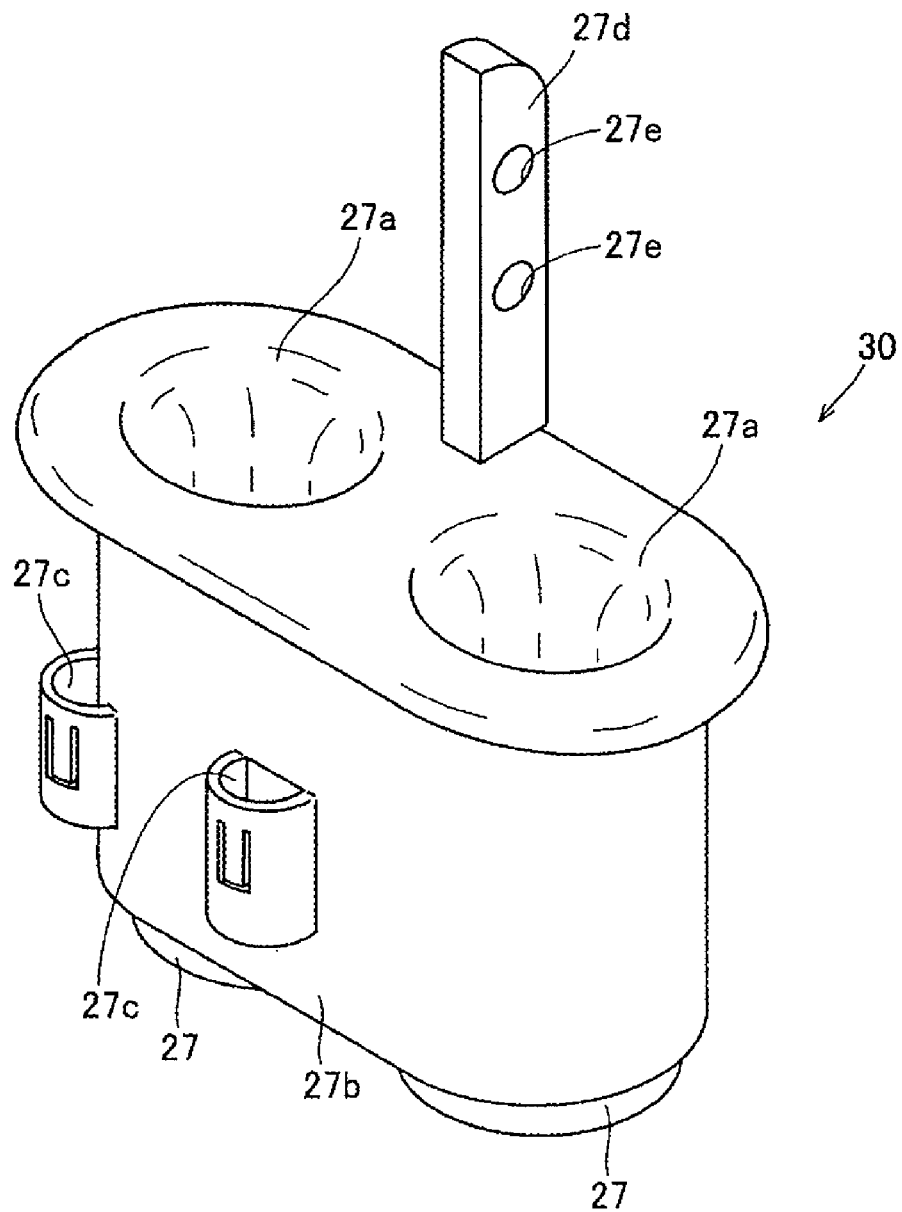

[Fig. 13]
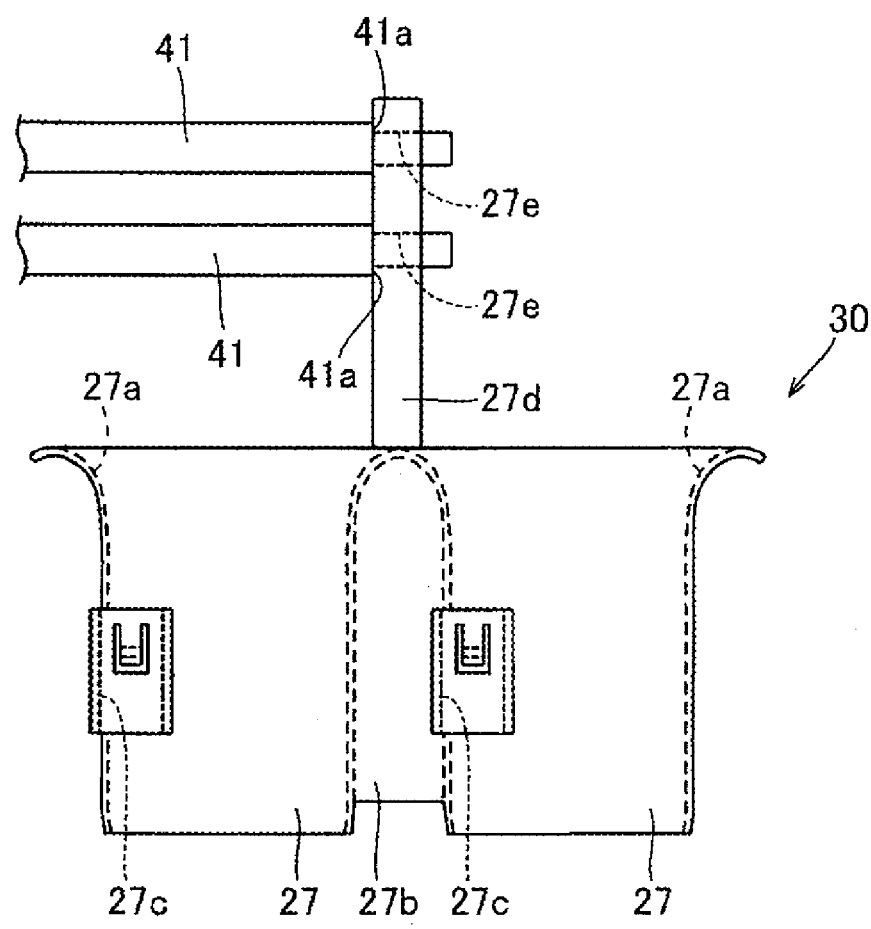

[Fig. 14]
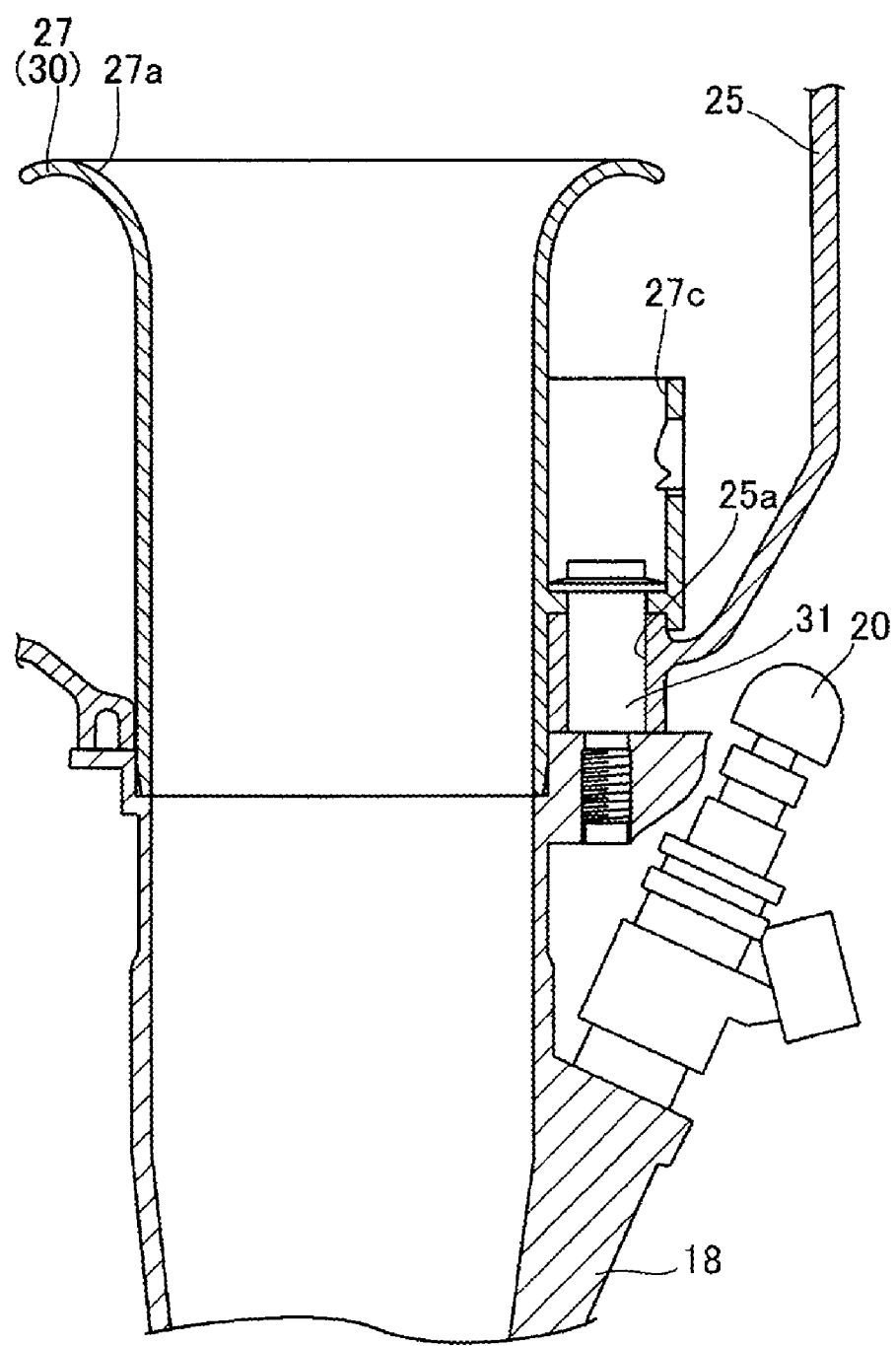

[Fig. 15]
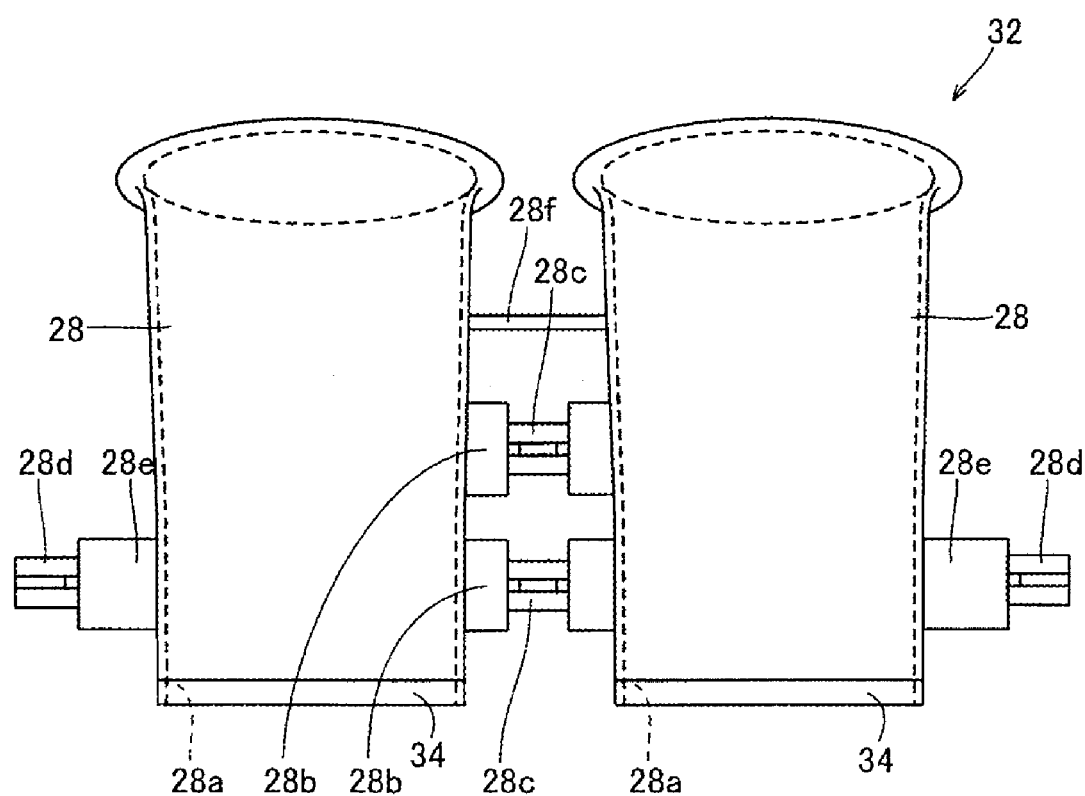

[Fig. 16]
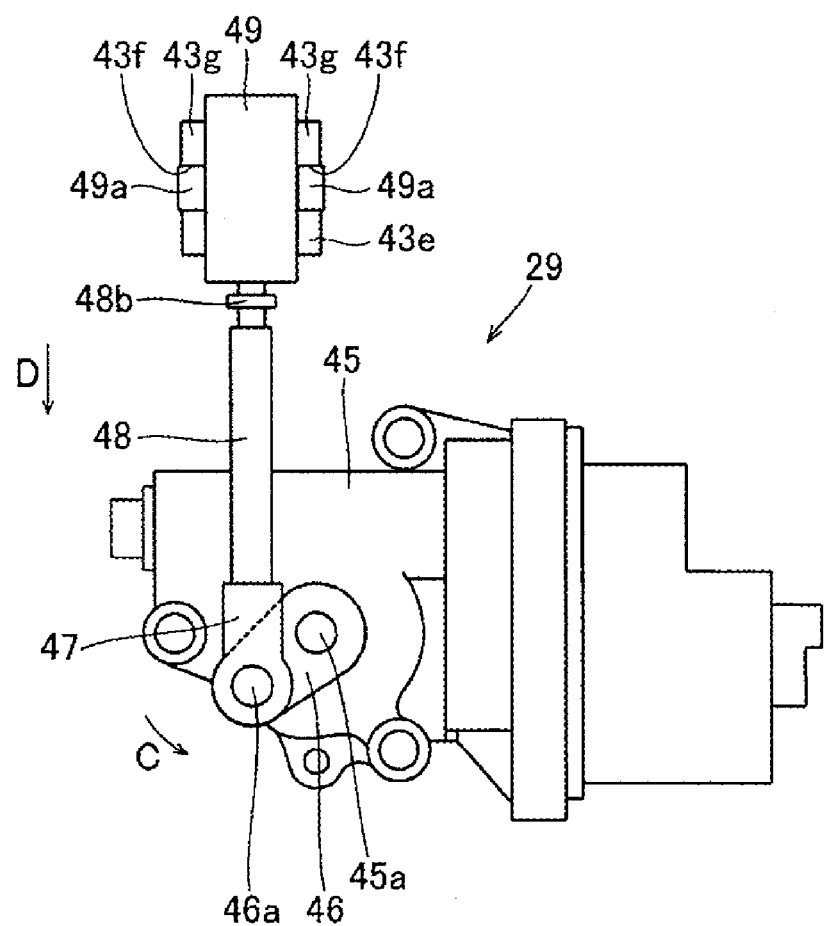

[Fig. 17]
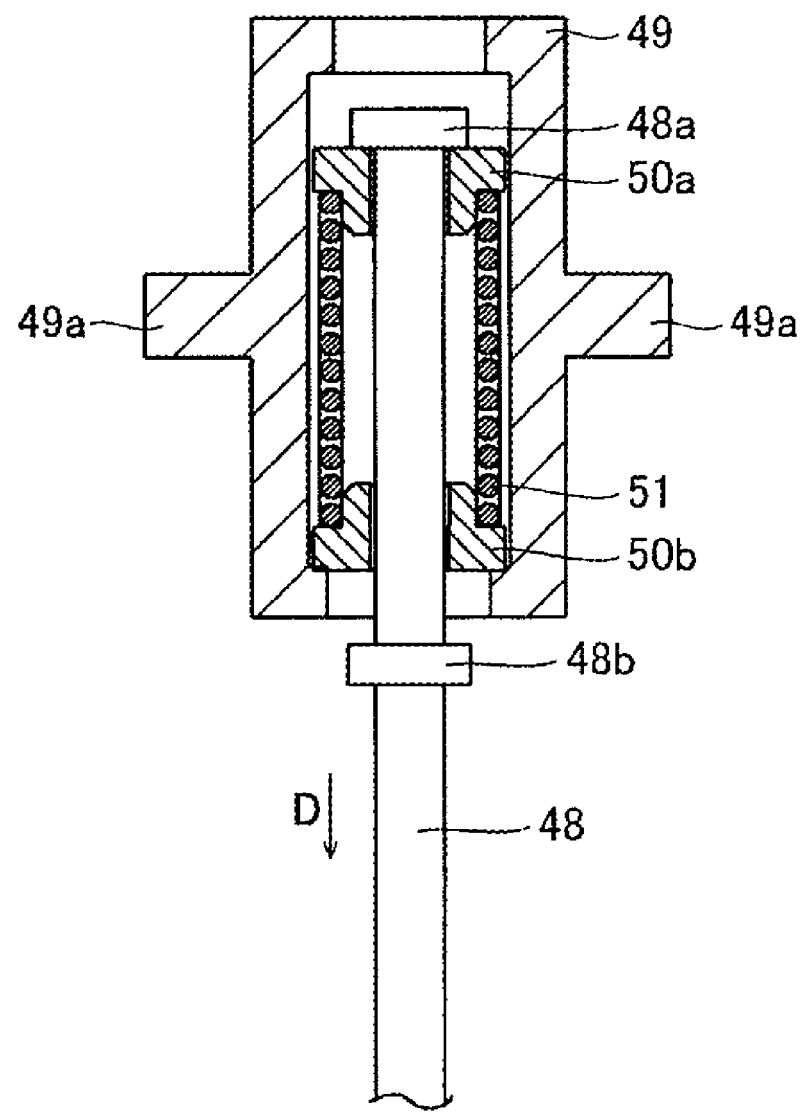

[Fig. 18]
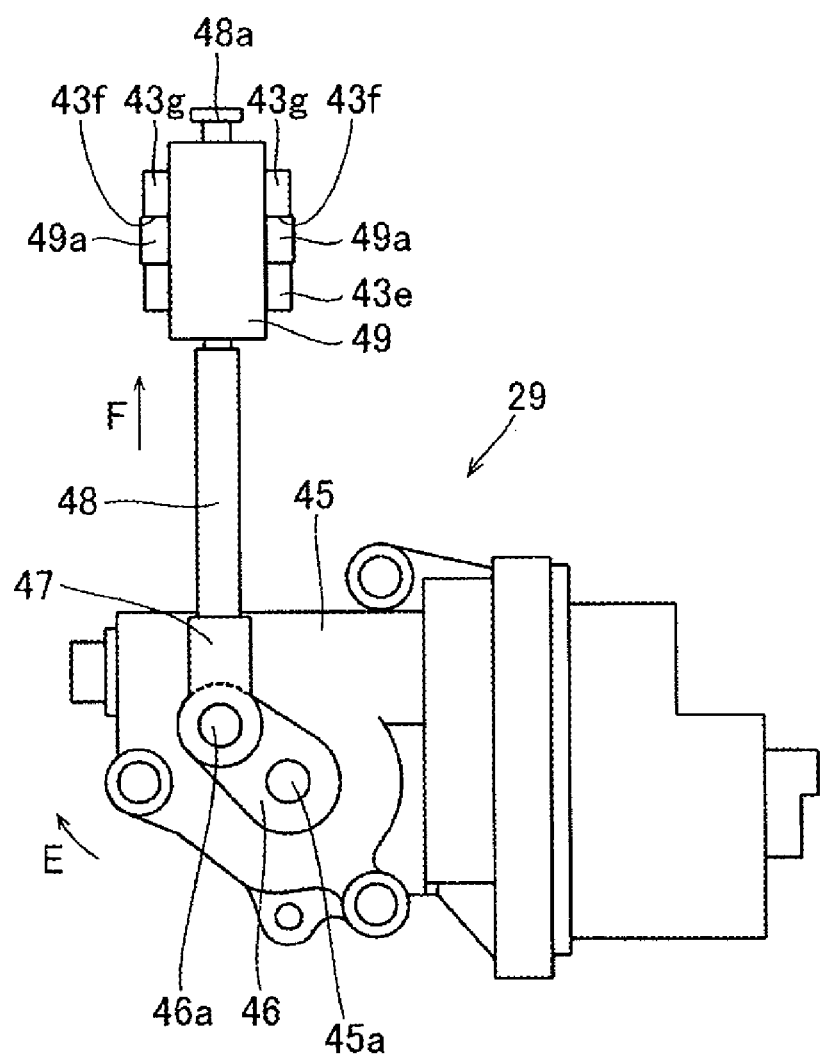

[Fig. 19]
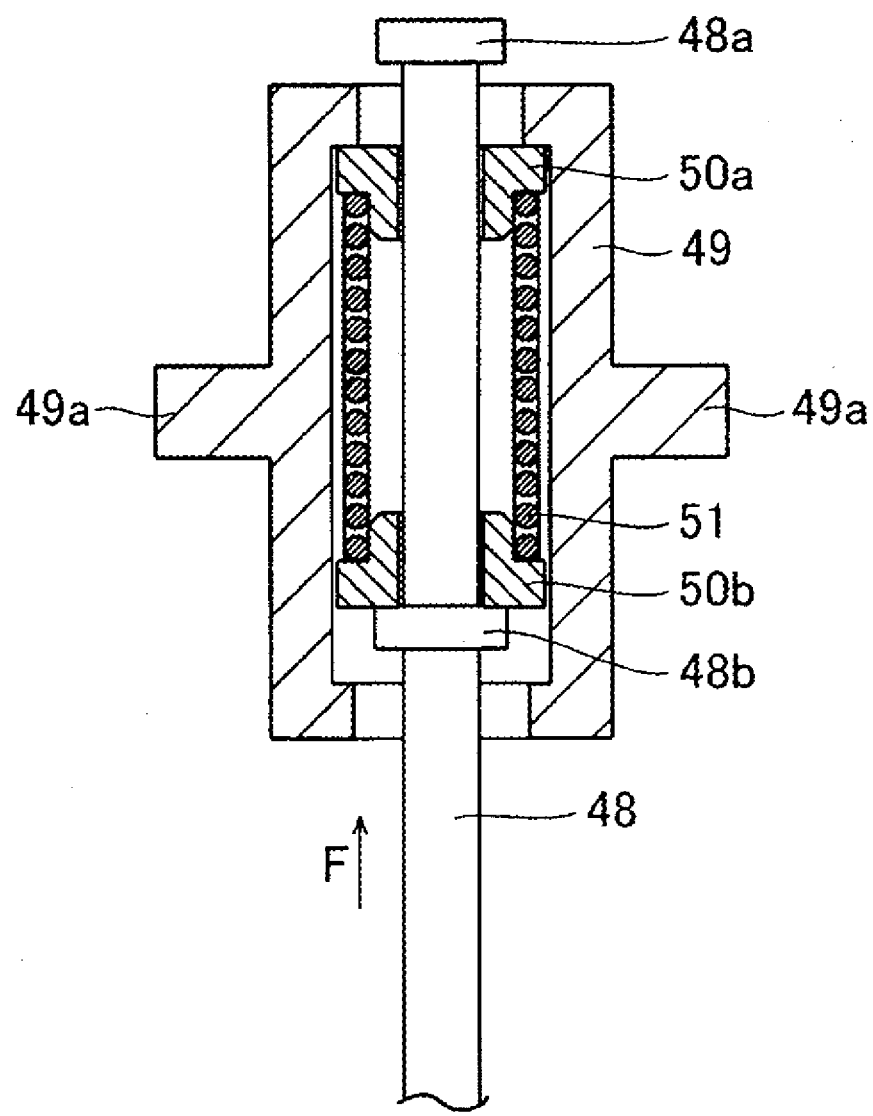

ENGINE AIR INTAKE ARRANGEMENT FOR A VEHICLE

CROSS-REFERENCE TO RELATED APPLICATIONS

This application claims priority from Japanese Patent Application Nos. 2006-253642, filed Sep. 20, 2006, and 2006-009139, filed Jan. 17, 2006, the entireties of which are incorporated by reference herein. This application is also related to U.S. Application Nos. FY.52939US1A and FY.52939US2A, filed on even date herewith, and entitled ENGINE AIR INTAKE ARRANGEMENT FOR A VEHICLE, the entireties of which are incorporated by reference herein.

BACKGROUND OF THE INVENTION

1. Field of the Invention

The present invention relates to a vehicle and more particularly to a vehicle equipped with a funnel for introducing air to an intake port of an engine.

2. Description of the Related Art

Intake devices are known that are equipped with a funnel for introducing air to an intake port of an engine. For example, Japanese Patent Publication No. 02-223632 shows one such arrangement in which an intake device is equipped with a fixed funnel for delivering air, entering from a an upstream side of an air cleaner box, to an intake port of an engine. An extension pipe, or moveable funnel, is capable of being selectively coupled to the fixed funnel. A case, such as the air cleaner box, houses the fixed funnel and moveable funnel. The intake device is housed inside a tank cover in which a fuel tank is disposed. In addition, in order that an inner wall surface of the case and the moveable funnel do not come into contact, the case is structured such that the space of a portion of the case, which corresponds with the position to which the moveable funnel is moved when it is separated away from the funnel, is enlarged.

SUMMARY OF THE INVENTION

However, in the structure disclosed in Japanese Patent Publication No. 02-223632, the case, or air cleaner box, is structured such that the portion of the intake box that accommodates the moveable funnel in a position in which it is separated from the fixed funnel is enlarged to provide sufficient space to receive a the moveable funnel without contact between the moveable funnel and the case. As a result, the intake device disposed inside the tank cover has a larger size.

Preferred embodiments of the present invention overcome the above-described problems and provide a vehicle that inhibits a size increase of a case (e.g., the air cleaner box) of an intake device. In one aspect of the present invention, a vehicle includes an engine having an intake port. A fixed funnel delivers air to the intake port of the engine. A moveable funnel is positioned on the intake side of the fixed funnel and selectively cooperates with the fixed funnel to deliver air to the intake port of the engine along with the fixed funnel. A linkage moveably supports the moveable funnel. A case, in which the fixed funnel and the moveable funnel are positioned, includes a protrusion at a portion that covers the moveable funnel. The protrusion is sized and shaped to accommodate the movable funnel in order to prevent contact between the case and the moveable funnel.

Another aspect of the present invention involves the vehicle described above, wherein the protrusion is provided in the portion of the case accommodating the fixed funnel and the moveable funnel and that covers the moveable funnel. The protrusion prevents the occurrence of contact between the case and the moveable funnel. As a result of providing this protrusion, it is possible to reduce the volume of the rear portion of the case as compared to when the entire rear portion of the case is made larger in order to prevent contact with the moveable funnel, and thereby avoid the necessity of a size increase of the case.

Yet another aspect of the present invention involves the vehicle described above, including a fuel tank that is positioned so as to cover a portion of the case that corresponds with the location of the moveable funnel, and is rearward of the case when the vehicle is viewed from the side. In addition, a recess is preferably provided in the portion of the fuel tank that corresponds with the protrusion of the case. As a result of adopting this structure, as compared to when the recess is not provided in the fuel tank, and the fuel tank is disposed to the rear a distance equivalent to the length of the protrusion of the case, it is possible to reduce the size of the gap between the case and the portions of the fuel tank adjacent the protrusion. More specifically, when the recess is provided in the portion of the fuel tank that corresponds to the protrusion of the case, it is possible to reduce the size of the gap between the case and the portions of the fuel tank other than the portion that corresponds to the protrusion. Accordingly, to the extent that the gap is made smaller, the area can be used as space for accommodating the fuel tank. As a result, it is possible to avoid a reduction in the volume of the fuel tank.

Still another aspect of the present invention involves the vehicle described above, in which the recess is provided in the portion of the fuel tank that corresponds to the protrusion of the case, and a gap between the fuel tank and the case is formed to have a constant size. As a result of adopting this structure, the entire gap between the fuel tank and the case can be set to have a constant size that is the smallest necessary. Accordingly, the volume of the fuel tank can be increased further still.

Another aspect of the present invention involves the vehicle described above, in which the linkage is a parallel linkage that has a plurality of linkage members that moveably support the moveable funnel such that it is capable of parallel movement relative to the fixed funnel. If this structure is adopted, the parallel linkage is used to move the moveable funnel. As a result, the outlet end of the moveable funnel can be separated from and brought into contact with the inlet end of the fixed funnel, while the outlet end of the moveable funnel is held parallel with respect to the inlet end of the fixed funnel. As a result, even if the outlet end of the moveable funnel is separated away from the inlet end of the fixed funnel, air that enters the fixed funnel, having passed through the moveable funnel, is able to flow linearly. Accordingly, it is possible to avoid increasing a flow resistance of the intake air. As a result, when the moveable funnel is separated away from the fixed funnel, a reduction of intake efficiency can be inhibited from occurring.

Another aspect of the present invention involves the vehicle described above, wherein when the engine is rotating at high speed, the linkage members rotate in a first direction to move the outlet end of the moveable funnel to a first position at which the outlet end is away from the inlet end of the fixed funnel. When the engine is rotating at low speed, the linkage members rotate in a second direction opposite the first direction to move the outlet end of the moveable funnel to a second position in which the outlet end is in contact with the inlet end of the fixed funnel. If this structure is adopted, when the rotation speed of the engine changes from low to high, the moveable funnel can be moved from the second position to the first position while the inlet end of the moveable funnel is held parallel with the inlet end of the fixed funnel. As a result, when the engine is rotating at high speed, air that enters through the fixed funnel having passed through the moveable funnel is able to flow linearly. Accordingly, it is possible to inhibit flow resistance of the air from increasing. As a result, when the engine is rotating at high speed, reduction of intake efficiency can be inhibited from occurring.

A further aspect of the present invention involves the vehicle described above, an amount of rotation of the linkage members is adjusted such that the position of the outlet end of the moveable funnel in the first position is the same as the position of the outlet end of moveable funnel in the second position when viewed along an axis defined by the inlet of the fixed funnel. If this structure is adopted, when the moveable funnel is moved from the second position to the first position (when the engine is rotating at high speed), the air entering the fixed funnel, having passed through the moveable funnel, is able to flow in a substantially linear manner. Accordingly, it is possible to inhibit flow resistance of the air from increasing.

Yet another aspect of the present invention involves the vehicle described above, in which the engine has a plurality of intake ports and there are a plurality of moveable funnels, with each moveable funnel corresponding to one of the intake ports. The protrusion provided in the case is located at a position that corresponds with the positions at which the moveable funnels are provided. As a result of adopting this structure, the protrusion that prevents contact occurring with the moveable funnel can be easily provided in accordance with the positioning arrangement of the moveable funnels.

Yet another aspect of the present invention involves the vehicle described above, in which the engine includes a plurality of intake ports that are arranged linearly. Wherein the moveable funnel, which is supported by the parallel linkage, is provided in a plurality, with each moveable funnel being located at a position that corresponds with a respective one of the intake ports when the vehicle is viewed from above. The protrusion being formed at a position that corresponds with the positions at which the moveable funnels are provided. If this structure is adopted, the member positioned at the portion that corresponds with the protrusions of the case can be formed linearly in alignment with the protrusions of the case. Thus, it is not necessary to make the shape of the member like the fuel tank, which is disposed at the portion corresponding to the protrusion of the case, complicated.

Still another aspect of the present invention involves the vehicle described above, in which the plurality of intake ports of the engine is arranged in a vehicle width direction. If this structure is adopted, it is possible to easily inhibit the engine from becoming longer in the length direction.

Another aspect of the present invention involves the vehicle described above, further including a resin cover that is disposed so as to cover a portion of the fuel tank and a portion of the case. If this structure is adopted, the portions of the case and the fuel tank can be easily protected. In one arrangement, the resin cover is disposed so as to cover the gap formed between the fuel tank and the case. If this structure is adopted, the resin cover can be used to simply inhibit entry of dirt or the like into the gap between the fuel tank and the case. In one arrangement, the resin cover is disposed so as to be smoothly contiguous with a surface of a portion of the fuel tank that is not covered by the resin cover. If this structure is adopted, when the vehicle is running, air that flows from the front can smoothly pass to the rear, thereby reducing air resistance when the vehicle is running.

Another aspect of the present invention involves the vehicle described above, further comprising a drive source that drives the linkage in order to move the moveable funnel. The drive source is disposed, if the moveable funnel is taken as a reference point, to the opposite side from the side where the fuel tank is disposed. If this structure is adopted, as compared to when the drive source for moving the moveable funnel is disposed in the fuel tank, the space of the fuel tank side is increased, and this space can be used for disposing the fuel tank. As a result, the volume of the fuel tank is inhibited from being reduced.

BRIEF DESCRIPTION OF THE DRAWINGS

These and other features, aspects and advantages of the present invention are described below with reference to drawings of preferred embodiments, which are intended to illustrate and not to limit the present invention. The drawings contain nineteen (19) figures.

FIG. 1 is a side view showing the overall structure of a motorcycle having an engine air intake system including certain features, aspects and advantages of the invention.

FIG. 2 is a partial cross sectional view of a periphery portion of a fuel tank and an air cleaner box of the motorcycle of FIG. 1.

FIG. 3 is a side view of a periphery area of funnels of the motorcycle of FIG. 1.

FIG. 4 is a side view of the periphery area of the funnels of the motorcycle of FIG. 1.

FIG. 5 is a top view of a portion of the motorcycle of FIG. 1 showing the fuel tank and air cleaner box, which is illustrated in phantom line.

FIG. 6 is a front, partial cross-sectional view of the air cleaner box and the funnels of the motorcycle of FIG. 1.

FIG. 7 is a perspective view showing the moveable funnels of the motorcycle of FIG. 1 in a separated position relative to the fixed funnels.

FIG. 8 is a side view showing the moveable funnels of the motorcycle of FIG. 1 in the separated position.

FIG. 9 is a perspective view showing the moveable funnels of the motorcycle of FIG. 1 in a contacting position relative to the fixed funnels.

FIG. 10 is a side view showing the moveable funnels of the motorcycle of FIG. 1 in the contacting position.

FIG. 11 is a plan view illustrating the intake system of the motorcycle of FIG. 1.

FIG. 12 is a perspective view of fixed funnels of the motorcycle of FIG. 1.

FIG. 13 is a front view of the fixed funnels of the motorcycle of the embodiment shown in FIG. 1.

FIG. 14 is a cross sectional view that illustrates a fastener insertion hole of the fixed funnels shown in FIG. 12 and FIG. 13.

FIG. 15 is a front view of the moveable funnels of the motorcycle of FIG. 1.

FIG. 16 is a front view of a funnel moving mechanism of the motorcycle of FIG. 1.

FIG. 17 is a cross sectional view of a moving member of the funnel moving mechanism shown in FIG. 16.

FIG. 18 is a front view of the funnel moving mechanism of FIG. 16.

FIG. 19 is a cross sectional view illustrating the structure of the moving member of the funnel moving mechanism of FIG. 18.

DETAILED DESCRIPTION OF THE PREFERRED EMBODIMENT

FIG. 1 is a side view of an overall structure of a motorcycle having certain features, aspects and advantages of the present invention. FIG. 2 to FIG. 19 illustrate the structure of funnels of an engine air intake system of the motorcycle of FIG. 1. The motorcycle of FIG. 1 to FIG. 19 is one example of a vehicle of the present invention. Certain features, aspects and advantages of the present invention may be employed on other vehicles as well. In the figures, the arrow FWD indicates a forward direction of the motorcycle in the direction that it runs. The structure of a preferred embodiment of the motorcycle is described with reference to FIG. 1 to FIG. 19.

In the structure of the motorcycle shown in FIG. 1 and FIG. 2, a front end portion of a main frame 2 is connected to a head pipe 1. The main frame 2, as shown in FIG. 3, is disposed such that it splits and extends to the left and right with respect to the forward direction of a vehicle body. In addition, as can be seen from FIG. 1 and FIG. 2, the main frame 2 is formed to extend downward and rearward. Further, a seat rail 3 that extends upward and rearward is connected to the main frame 2. In addition, a steering mechanism 4 is rotatably attached to the head pipe 1. A handle 5 is attached to the upper end of the steering mechanism 4, and a clutch lever 6 is attached to the handle 5. Further, a front fork 7 is attached to a lower end of the steering mechanism 4, and a front wheel 8 is rotatably mounted to a lower end portion of the front fork 7.

In addition, a front end portion of a swing arm 10 is attached via a pivot bearing 9 to a rear end portion of the main frame 2. A rear wheel 11 is rotatably mounted to a rear end portion of the swing arm 10. Further, an air cleaner box 25 and a fuel tank 12 that is rearward of the air cleaner box 25, described hereinafter, are disposed generally above the main frame 2. In addition, a seat 13 is disposed generally above the seat rail 3, and an engine 14 is mounted underneath of the main frame 2.

The engine 14, as shown in FIG. 4, includes a piston 15, a cylinder 16, a cylinder head 17, and a throttle body 18. The piston 15 is fitted inside the cylinder 16 and the cylinder head 17 is disposed so as to block the opening at one end of the cylinder 16. Further, an intake port 17a and an exhaust port 17b are formed in the cylinder head 17. The intake port 17a is provided to supply an air-fuel mixture including air and fuel to a combustion chamber 16a of the cylinder 16. Further, the exhaust port 17b is provided to exhaust residual gas remaining after combustion from the combustion chamber 16a of the cylinder 16. Moreover, an intake valve 19a and an intake valve 19b are respectively provided in the intake port 17a and the exhaust port 17b. The throttle body 18 is attached to an opening of the intake port 17a. Further, an injector 20 is attached to the throttle body 18 in order to inject fuel to the intake port 17a. In addition, an exhaust pipe 21 is attached to an opening of the exhaust port 17b. This exhaust pipe 21 is connected to a muffler 22 (refer to FIG. 1 and FIG. 2). Note that, although only one cylinder 16 is shown in FIG. 4, in reality multiple cylinders (such as four cylinders 16) are linearly disposed at predetermined distances apart in the width direction of the vehicle. In other words, the engine 14 of the embodiment is an in-line 4-cylinder engine.

Further, as can be seen in FIG. 1 and FIG. 2, a front cowl 23 that includes an upper cowl 23a and a lower cowl 23b is provided so as to cover a front side of the vehicle body. Intake holes 23c are provided in a front side of the lower cowl 23b. Note that, FIG. 1 and FIG. 2 only show, with respect to the forward direction of the vehicle body, the left side intake hole 23c. However, preferably a pair of the intake holes 23c is provided in a left-right symmetrical manner with respect to the forward direction of the vehicle body. Further, air ducts 24 are connected to the intake holes 23c of the lower cowl 23b. In addition, as shown in FIG. 1 to FIG. 3, the air cleaner box 25, which is supplied with air form the air ducts 24, is disposed between the main frame 2 that branches to the left and right.

Note that, in this embodiment, as shown in FIG. 4, a rear portion and a rear portion upper surface of the air cleaner box 25 are covered by the fuel tank 12. Further, a cover 25a made of resin is positioned so as to cover an upper surface of a front portion of the air cleaner box 25 and a front portion of the fuel tank 12. Moreover, the resin cover 25a also covers a gap 60 between the fuel tank 12 and the air cleaner box 25. In addition, as shown in FIG. 4 and FIG. 5, a portion of the fuel tank 12 that is not covered by the resin cover 25a and the resin cover 25a are disposed so as to be smoothly contiguous with each other. As a result, when the motorcycle is moving, air that flows from the front can smoothly pass to the rear, thereby reducing air resistance when the motorcycle is moving. Note that, the air cleaner box 25 is one example of a "case" of the present invention.

In addition, in the embodiment, a protrusion 25b is provided at the rear portion of the air cleaner box 25 that protrudes to the outside of the air cleaner box 25. The protrusion 25b, as can be seen in FIG. 4, is provided so as to protrude to the outside at a region that corresponds to a rear portion of an upper edge portion of a moveable funnel 28, described hereinafter, such that the rear portion of the upper edge portion of the moveable funnel 28 does not come into contact with an inner surface of the air cleaner box 25 when the moveable funnel 28 is raised. As a result, as compared to when the entire rear portion of the air cleaner box 25 is made larger, it is possible to avoid a size increase of the air cleaner box 25. Further, a recess 12a is provided in a portion of the fuel tank 12 that corresponds to the protrusion 25b. As a result, as compared to the case when the recess 12a is not provided in the fuel tank 12, and the fuel tank 12 is disposed to the rear a distance equivalent to the length of the protrusion 25b of the air cleaner box 25, it is possible to reduce the size of the gap between the air cleaner box 25 and the portions of the fuel tank 12 other than the portion that corresponds to the protrusions 25b. More specifically, when the recess 12a is provided in the portion of the fuel tank 12 that corresponds to the protrusion 25b of the air cleaner box 25, to the extent that the gap between the air cleaner box 25 and the portions of the fuel tank 12 other than the portion corresponding to the protrusion 25b is reduced in size, the area can be used as space for disposing the fuel tank 12. Further, the air cleaner box 25 and the fuel tank 12 are positioned such that across the entire region in which the air cleaner box 25 and the fuel tank 12 face each other, the gap 60 between the air cleaner box 25 and the fuel tank 12 has a constant distance D (preferably about 10 mm) that is a preferred minimal distance. As a result, the structure allows the air cleaner box 25 and the fuel tank 12 to be positioned such that they do not come into contact with each other, and allows the volume of the fuel tank 12 to be increased further still. Note that, the distance D is just one example of a "constant size" of the invention. In addition, the protrusion 25b of the air cleaner box 25, as shown in FIG. 5, is provided at two locations on the left and right sides of the upper surface of the air cleaner box 25. Further, as can be seen in FIG. 3 and FIG. 4, an air filter 26 for filtering the air supplied from the air ducts 24 is provided inside the air cleaner box 25.

Moreover, as shown in FIG. 3, FIG. 4 and FIG. 6, fixed funnels 27, moveable funnels 28, and a funnel moving mechanism 29 are provided inside the air cleaner box 25. One each of the fixed funnel 27 and the moveable funnel 28 are provided for each cylinder 16 of the engine 14. Note that, each one of the protrusions 25b provided at two locations in the air cleaner box 25 are formed such that contact with the moveable funnels 28 of two cylinders is prevented. Further, four of the moveable funnels 28 are linearly positioned at positions that correspond with the arrangement positions of the intake ports 17a when the motorcycle is viewed from the top side thereof, and the two protrusions 25b are formed linearly in alignment with the moveable funnels 28. Further, the fixed funnels 27 are fixed with respect to the air cleaner box 25 and function to introduce filtered air inside the air cleaner box 25 to the intake ports 17a. In addition, the moveable funnels 28 are disposed on the intake or inlet side (the upstream side) of the fixed funnels 27, and function along with the fixed funnels 27 to introduce filtered air from inside the air cleaner box 25 to the intake ports 17a.

In addition, as shown in FIG. 7 to FIG. 10, each moveable funnel 28 is structured so as to be moveable between a separated position and a contacting position. The separated position (the state shown in FIG. 7 and FIG. 8) is a position at which an outlet of an outlet end 28a of the moveable funnel 28 is separated away from an inlet of the inlet end 27a of the fixed funnel 27. The contacting position (the state shown in FIG. 9 and FIG. 10) is a position at which the outlet end 28a of the moveable funnel 28 is placed in contact with the inlet end 27a of the fixed funnel 27. Note that, as shown in FIG. 4, when the moveable funnel 28 is moved to the separated position (the state shown in FIG. 7 and FIG. 8), the intake passage that connects the air cleaner box 25 and the cylinder 16 is structured by the fixed funnel 27, the throttle body 18, and the intake port 17a. On the other hand, when the moveable funnel 28 is moved to the contacting position (the state shown in FIG. 9 and FIG. 10), the intake passage that connects the air cleaner box 25 and the cylinder 16 is structured by the moveable funnel 28, the fixed funnel 27, the throttle body 18 and the intake port 17a. Further, the funnel moving mechanism 29 functions to move the moveable funnels 28 between the separated position and the contacting position. Note that, the separated position and the contacting position are just examples of a "first position" and a "second position."

Note that, as illustrated in FIG. 11 to FIG. 13, the fixed funnels 27 are structured such that neighboring pairs of the fixed funnels 27 are integrally formed via a connecting portion 27b. More specifically, the embodiment includes two of a component 30 in which neighboring pairs of fixed funnels 27 are integrated. Further, three fastener insertion holes 27c (also referred to as "screw insertion holes") are respectively formed in each component 30 that integrates the pair of fixed funnels 27. Fasteners, such as screws 31 (FIG. 14), are inserted in the screw insertion holes 27c. In addition, as shown in FIG. 14, each fixed funnel 27 (the component 30) is attached to both the air cleaner box 25 and the throttle body 18 by screwing the screws 31 into the screw insertion holes 27c. Note that, screw insertion holes 25a into which the screws 31 are inserted are provided in the air cleaner box 25.

Further, as shown in FIG. 11 to FIG. 13, a strut 27d is integrally provided with the component 30 that integrates the pair of fixed funnels 27. A pair of turning shaft support holes 27e that rotatably support an end portion of turning shafts 41, described hereinafter, is formed in the strut 27d.

In addition, as shown in FIG. 11 to FIG. 15, the moveable funnels 28 have a structure in which neighboring pairs of moveable funnels 28 are formed integrally via a pair of support shafts 28b. In other words, the embodiment includes a pair of components 32 in which neighboring pairs of moveable funnels 28 are integrated. Further, the support shafts 28b are positioned between the pair of moveable funnels 28 of each component 32. Note that, as a result of the support shaft 28 being supported by a parallel linkage 42, described hereinafter, the moveable funnels 28 (the component 32) are held in a moveable manner. Further, reduced diameter portions 28c are formed in the support shafts 28b.

In addition, support shafts 28e having reduced diameter portions 28d are provided at the outer side surface of the component 32 that integrates the neighboring pairs of moveable funnels 28. Further, a strengthening rib 28f is provided between the pair of moveable funnels 28 of the component 32. Moreover, as shown in FIG. 11, two of the components 32 that integrate the pair of moveable funnels 28 are positioned such that the end surfaces of the respective reduced diameter portions 28d of the support shafts 28e face each other.

Further, referring to FIG. 11, a split bushing 33 is mounted on each reduced diameter portion 28c of the support shaft 28b of the moveable funnels 28 (the component 32). This split bushing 33 functions to allow turning of the parallel linkage 42 with respect to the support shaft 28b, described hereinafter. In addition, the split bushing 33 is also mounted on the reduced diameter portions 28d of the support shafts 28e positioned between the components 32 that integrate the pairs of moveable funnels 28. Note that, only one of the split bushing 33 is positioned between the components 32 that integrate the pairs of moveable funnels 28. This split bushing 33 is mounted so as to straddle between the reduced diameter portions 28d of the pair of support shafts 28e.

Further, referring to FIG. 6 to FIG. 8, a resilient, annular member, such as a rubber lip 34, is mounted on the outlet end portion 28a of each moveable funnel 28. This rubber lip 34 functions to seal the gap between the moveable funnel 28 and the fixed funnel 27 when the moveable funnel 28 is moved to the contacting position (the state shown in FIG. 10).

Moreover, in the embodiment, as shown in FIG. 8 to FIG. 10, the funnel moving mechanism 29 uses the parallel linkage 42 to move the moveable funnel 28 between the separated position (the state shown in FIG. 7 and FIG. 8) and the contacting position (the state shown in FIG. 9 and FIG. 10).

As shown in FIG. 11 to FIG. 13, the funnel moving mechanism 29 is configured such that the end portions of the turning shafts 41 are rotatably supported in the turning shaft support holes 27e of the strut 27d provided on the fixed funnel 27 (the component 30). Further, stepped portions 41a are provided in one end portion and another end portion of each turning shaft 41, and these stepped portions 41a abut with respective surfaces of the strut 27d that define the turning shaft support holes 27e. As a result, movement in the axial direction of the turning shafts 41 is controlled.

Further, as shown in FIG. 11, the parallel linkage 42 is attached respectively to the one end portion and the other end portion sides of the turning shafts 41 so as to turn along with the turning shafts 41. Note that, the parallel linkage 42 is just one example of a "link mechanism." The parallel linkage 42, as shown in FIG. 7 to FIG. 10, includes an upper linkage member 43 attached to the turning shaft 41 at the upper end, and a lower linkage member 44 attached to the turning shaft 41 at the lower end. Note that, the upper linkage member 43 and the lower linkage member 44 are just examples of a "link lever" of the invention.

The upper linkage member 43, as shown in FIG. 8, has a fitting portion 43a, a turning shaft insertion hole 43b, and a pair of stops 43c and 43d. As can be seen from FIG. 7 to FIG. 10, the support shaft 28b (the reduced diameter portion 28c) of the upper end of the moveable funnel 28 is fitted via the split bushing 33 in the fitting portion 43a of the upper linkage member 43. As a result, the upper linkage member 43 is rotatable with respect to the upper support shaft 28b. Further, as shown in FIG. 7 to FIG. 10, the upper turning shaft 41 is fixed to the turning shaft insertion hole 43b of the upper linkage member 43 such that the upper linkage member 43 turns along with the upper turning shaft 41. In addition, as shown in FIG. 8, the stop 43c of the upper linkage member 43 functions to control turning of the upper linkage member 43 in direction A by abutting with the strut 27d of the fixed funnel 27 when the upper linkage member 43 has turned a specific amount in direction A. Further, as shown in FIG. 10, the stop 43d of the upper linkage member 43 functions to control turning in direction B of the upper linkage member 43 by abutting with the strut 27d of the fixed funnel 27 when the upper linkage member 43 has turned a specific amount in direction B. Note that, the arrow showing direction A is just one example of a "first direction" and the arrow showing direction B is just one example of a "second direction."

In addition, referring to FIG. 10 and FIG. 11, a support portion 43e that is supported by a moving member 49, described hereinafter, is provided in the upper linkage member 43 that provides one of the supports for the moveable funnels 28 (the component 32). The support portion 43e is structured by a pair of retaining tabs 43g in which respective notches 43f are formed, and is positioned at the opposite side to the fitting portion 43a. Note that, the support portion 43e, described above, is not provided in the lower linkage member 44 that provides the other support for the moveable funnels 28 (the component 32).

In addition, the lower linkage member 44, as can be seen from FIG. 8 to FIG. 10, has a fitting portion 44a and a turning shaft insertion hole 44b. The lower support shaft 28b (the reduced diameter portion 28c) of the moveable funnel 28 is fitted to the fitting portion 44a of the lower linkage member 44 via the split bushing 33. As a result, the lower linkage member 44 is rotatable with respect to the lower support shaft 28b. Further, the lower turning shaft 41 is fixed in the turning shaft insertion hole 44b of the lower linkage member 44 such that the lower linkage member 44 turns along with the lower turning shaft 41. As shown in FIG. 11, a link lever 44d having a fitting portion 44a, and a turning shaft insertion hole 44b like the lower linkage member 44, and a split portion 44c is positioned between the components 32 that integrate the pairs of moveable funnels 28.

As a result of giving the parallel linkage 42 the structure described above, as can be seen in FIG. 8, when the parallel linkage 42 turn in direction A, each moveable funnel 28 moves in the direction away from the fixed funnel 27. Further, as shown in FIG. 10, when the parallel linkage 42 turn in direction B, each moveable funnel 28 moves in the direction toward the fixed funnel 27. Note that, as shown in FIG. 8 and FIG. 10, the turning amount of the parallel linkage 42 is adjusted such that the position of an outlet end surface 28g (FIG. 7, FIG. 8 and FIG. 10) of the moveable funnel 28 in the separated position (the state of FIG. 8), and the position of the outlet end surface 28g (FIG. 7, FIG. 8 and FIG. 10) of the moveable funnel 28 in the contacting position (the state of FIG. 10) are the same when viewed from the opening direction of the fixed funnel 27, or along the axis defined by the inlet opening of the inlet end 27a of the fixed funnel 27. More specifically, as shown in FIG. 8 and FIG. 10, adjustment is performed such that a central axis 200 of the outlet end surface 28g of the moveable funnel 28 in the separated position (the state shown in FIG. 8) and a central axis 200 of the outlet end surface 28g of the moveable funnel 28 in the contacting position (the state shown in FIG. 10) are aligned. In addition, the amount of rotation of the parallel linkage 42 is adjusted such that the position of the upper support shaft 28b in the separated position (the state shown in FIG. 8) when viewed along the axis 300 of the fixed funnel 27, and the position of the upper support shaft 28b in the contacting position (the state shown in FIG. 10) when viewed along the axis 300 of the fixed funnel 27 are the same. Further, the amount of rotation of the parallel linkage 42 is adjusted such that the position of the lower support shaft 28b in the separated position (the state shown in FIG. 8) when viewed along the axis 300 of the fixed funnel 27, and the position of the lower support shaft 28b in the contacting position (the state shown in FIG. 10) when viewed along the axis 300 of the fixed funnel 27 are the same. In addition, the amount of rotation of the parallel linkage 42 is adjusted such that the such that the position of the upper support shaft 28b in the separated position (the state shown in FIG. 8) when viewed along the axis 300 of the fixed funnel 27, and the position of the lower support shaft 28b in the separated position (the state shown in FIG. 8) when viewed along the axis 300 of the fixed funnel 27 are the same. Further, the amount of rotation of the parallel linkage 42 is adjusted such that the position of the upper support shaft 28b in the contacting position (the state shown in FIG. 10) when viewed along the axis 300 of the fixed funnel 27, and the position of the lower support shaft 28b in the contacting position (the state shown in FIG. 10) when viewed along the axis 300 of the fixed funnel 27 are the same.

Moreover, as shown in FIG. 8, the stop 43c of the parallel linkage 42 (the upper linkage member 43) is adjusted so as to abut with the strut 27d when the moveable funnel 28 reaches the separated position. Further, as shown in FIG. 10, the stop 43d of the parallel linkage 42 (the upper linkage member 43) is adjusted so as to abut with the strut 27d when the moveable funnel 28 reaches the contacting position.

In addition, in the embodiment, as shown in FIG. 8 and FIG. 11, the parallel linkage 42 including the upper linkage member 43 and the lower linkage member 44 is caused to turn by driving force of a motor 45. More specifically, an output shaft 45a of the motor 45 is attached to one end portion of a turning lever 46. Note that, the motor 45 is just one example of a "drive source." Further, as shown in FIG. 4, the motor 45 is located at a position that is between an upstream portion of the flow of air from the air filter 26 disposed inside the air cleaner box 25, and a downstream portion of the flow of air from the air filter 26. Further, the motor 45 is provided outside the air cleaner box 25. More specifically, the air cleaner box 25 is provided with a U-shape, and provided with an upstream portion to the upstream of the air filter 26 and a downstream portion to the downstream of the air filter 26 that face each other. Further, the motor 45 is positioned between the upstream portion to the upstream side of the air filter 26 and the downstream portion to the downstream side of the air filter 26 that face each other. In addition, the motor 45 is positioned, with respect to the moveable funnel 28, on the opposite side from the fuel tank 12.

Moreover, as shown in FIG. 8 and FIG. 11, a generally spherical support member 46a is provided on the other end portion of the turning lever 46. A connecting member 47 is attached to the spherical support member 46a of the turning lever 46 such that the connecting member 47 is capable of rocking with respect to the support member 46a. Further, a connecting rod, or moving shaft 48, is attached to the connecting member 47. As can be seen in FIG. 17, an upper pressing member 48a and a lower pressing member 48b are provided on the moving shaft 48. The upper pressing member 48a is positioned at the end portion of the moving shaft 48 at the opposite side from the connecting member 47 (FIG. 16). Further, the lower pressing member 48b is positioned in a region that is a predetermined distance of separation in the downward direction from the upper pressing member 48a of the moving shaft 48.

In addition, a moving member 49 is positioned at the side of the one end portion of the moving shaft 48 where the upper pressing member 48a and the lower pressing member 48b is provided. Both side surfaces of this moving member 49, as shown in FIG. 16, are provided with protrusions 49a that engage with the pair of notches 43f formed in the upper linkage member 43. Further, the retaining tabs 43g of the upper linkage member 43 are positioned so as to sandwich the moving member 49, and the notches 43f are engaged with the protrusions 49a. As a result, the upper linkage member 43 (the support portion 43e) is supported by the moving member 49. Moreover, as shown in FIG. 17, bushings 50a and 50b for slidably supporting the moving shaft 48 are provided inside the moving member 49. The bushings 50a and 50b are disposed between the upper pressing member 48a and the lower pressing member 48b. Further, a compression spring 51 is attached between the bushing 50a and the bushing 50b inside the moving member 49.

Further, when the turning lever 46 is turned in direction C by the driving force of the motor 45 (the state shown in FIG. 16), as shown in FIG. 17, the compression spring 51 generates energizing force in direction D as a result of movement of the moving shaft 48 in direction D. As a result, the moving member 49 is biased in direction D by the compression spring 51. Accordingly, as can be seen in FIG. 8, the biasing force of the compression spring 51 (FIG. 17), is transmitted to the parallel linkage 42 via the moving member 49, whereby the parallel linkage 42 is turned in direction A. Further, when the stop 43c of the parallel linkage 42 abuts with the strut 27d as well, the biasing force of the compression spring 51 (refer to FIG. 17) is transmitted via the moving member 49 to the parallel linkage 42 such that the parallel linkage 42 turns in direction A.

On the other hand, when the turning lever 46 is turned in direction E by the driving force of the motor 45 (the state shown in FIG. 18), the compression spring 51 generates a biasing force in direction F as a result of movement of the moving shaft 48 in direction F, as shown in FIG. 19. As a result, the moving member 49 is biased in direction F by the compression spring 51. Accordingly, as can be seen in FIG. 10, the biasing force of the compression spring 51 (FIG. 19), is transmitted to the parallel linkage 42 via the moving member 49, whereby the parallel linkage 42 is turned in direction B. Further, when the stop 43d of the parallel linkage 42 abuts with the strut 27d as well, the biasing force of the compression spring 51 (refer to FIG. 19) is transmitted via the moving member 49 to the parallel linkage 42 such that the parallel linkage 42 turns in direction B.

Next, an operation that is performed when the length of the intake passage that connects between the air cleaner box 25 and the cylinder 16 is changed is described with reference to FIG. 4, FIG. 8, FIG. 10, and FIG. 16 to FIG. 19.

When the engine 14 shown in FIG. 4 is rotating at high speed, the intake passage is made shorter to more easily obtain a pulsation effect. In other words, when the engine 14 is rotating at high speed, the moveable funnel 28 is moved to the separated position.

More particularly, first, as shown in FIG. 16, the turning lever 46 is turned in direction C by the motor 45 of the funnel moving mechanism 29. Accordingly, the moving shaft 48 is moved in direction D. As a result, as shown in FIG. 7, the compression spring 51 (FIG. 17) generates a biasing force in direction D, whereby the moving member 49 is moved in direction D. Thus, the parallel linkage 42 is turned in direction A. Following this, the parallel linkage 42 continues turning in direction A until the stop 43c of the upper linkage member 43 abuts with the strut 27d.

As a result, the moveable funnel 28 is moved to the separated position at which the outlet end surface of the outlet end 28a of the moveable funnel 28 is held parallel with respect to the inlet end surface of the inlet end 27a of the fixed funnel 27. Accordingly, when the engine 14 (refer to FIG. 4) is rotating at high speed, the fixed funnel 27, the throttle body 18 (FIG. 4), and the intake port 17a (FIG. 4) structure the intake passage. As a result the intake passage is shortened. Note that, when the engine 14, as shown in FIG. 4, is rotating at high speed and the intake passage is shortened, high pressure-pressure waves can more easily reach the opening at the cylinder 16 side of the intake port 17a when the intake valve 19a is open, whereby intake efficiency is improved.

Note that, as shown in FIG. 8, when the moveable funnel 28 reaches the separated position, the position of the outlet end surface of the moveable funnel 28, when viewed along the axis 300 of the fixed funnel 27, is the same as the position of the outlet end surface of the moveable funnel 28 in the contacting position (the state of FIG. 10). Further, when the moveable funnel 28 reaches the separated position, the biasing force of the compression spring 51 (FIG. 17) is transmitted to the parallel linkage 42 via the moving member 49 such that the parallel linkage 42 is turned in direction A.

Next, in order to make it easier to obtain a pulsation effect when the engine 14 shown in FIG. 4 is rotating at low speed, the intake passage is lengthened. In other words, when the engine 14 is rotating at low speed, the moveable funnel 28 is moved to the contacting position.

More specifically, first, as shown in FIG. 18, the turning lever 46 is turned in direction E by the motor 45 of the funnel moving mechanism 29. Accordingly, the moving shaft 48 is moved in direction F. As a result, as shown in FIG. 10, the compression spring 51 (FIG. 19) generates a biasing force in direction F, whereby the moving member 49 is moved in direction F. Thus, the parallel linkage 42 is turned in direction B. Following this, the parallel linkage 42 continues turning in direction B until the stop 43d of the upper linkage member 43 abuts with the strut 27d.

As a result, the moveable funnel 28 is moved to the contacting position at which the opening surface of the outlet end 28a of the moveable funnel 28 is held parallel with respect to the opening surface of the inlet end 27a of the fixed funnel 27. Accordingly, when the engine 14 (FIG. 4) is rotating at low speed, the moveable funnel 28, the fixed funnel 27, the throttle body 18 (FIG. 4), and the intake port 17a (FIG. 4) structure the intake passage. As a result the intake passage is lengthened. Note that, when the engine 14 shown in FIG. 4 is rotating at low speed and the intake passage is lengthened, high pressure-pressure waves can more easily reach the opening at the cylinder 16 side of the intake port 17a when the intake valve 19a is open, whereby intake efficiency is improved.

Note that, as shown in FIG. 10, when the moveable funnel 28 reaches the contacting position, the biasing force of the compression spring 51 (FIG. 19) is transmitted to the parallel linkage 42 via the moving member 49 such that the parallel linkage 42 is turned in direction B.

In this embodiment, as described above, the protrusions 25b are provided at the portion of the air cleaner box 25, which accommodates the moveable funnels 28 and the fixed funnels 27, that covers the moveable funnels 28. The protrusions 25b are provided to prevent contact occurring with the moveable funnels 28. As a result of this structure, as compared to when the entire rear portion of the air cleaner box 25 is made larger to prevent contact occurring with the moveable funnels 28, the volume of the rear portion of the air cleaner box 25 can be made smaller. Accordingly, it is possible to inhibit size increase of the air cleaner box 25.

Further, in this embodiment, the recess 12a is provided in the portion of the fuel tank 12 corresponding to the protrusions 25b of the air cleaner box 25, and the fuel tank 12 is disposed so as to cover the portion corresponding to the portion where the moveable funnels 28 of the air cleaner box 25 are disposed and is disposed to the rear side in the running direction (the direction of the arrow FWD) of the motorcycle. As a result of providing the recess 12a, as compared to when no recess 12a is provided in the fuel tank 12 and the fuel tank 12 is disposed a length equivalent to the protrusion length of the protrusions 25b of the air cleaner box 25 in the rearward direction, it is possible to reduce the size of the gap between the air cleaner box 25 and the portions of the fuel tank 12 other than the portion that corresponds to the protrusions 25b. In other words, in the case that the recess 12a is provided in the portion of the fuel tank 12 that corresponds to the protrusions 25b of the air cleaner box 25, it is possible to reduce the size of the gap between the air cleaner box 25 and the portions of the fuel tank 12 other than the portion that corresponds to the protrusions 25b, whereby to the extent that the gap is reduced in the size, the area can be used as space for disposing the fuel tank 12. As a result, it is possible to inhibit the volume of the fuel tank 12 from being reduced.

Moreover, in this embodiment, the parallel linkage 42 is used to move the moveable funnel 28. Accordingly, the outlet end 28a of the moveable funnel 28 can be separated from and brought into contact with respect to the inlet end 27a of the fixed funnel 27, while the outlet end 28a of the moveable funnel 28 is held parallel with respect to the inlet end surface 27a of the fixed funnel 27. As a result, even if the outlet end 28a of the moveable funnel 28 is separated away from the inlet end 27a of the fixed funnel 27, air that enters the fixed funnel 27 having passed through the moveable funnel 28 is able to flow linearly. Accordingly, it is possible to inhibit flow resistance of the air from increasing. As a result, when the moveable funnel 28 is separated away from the fixed funnel 27, reduction of intake efficiency can be inhibited from occurring.

Further, in this embodiment, the amount of rotation of the parallel linkage 42 is adjusted such that the position of the outlet end surface of the moveable funnel 28 in the separated position, and the position of the outlet end surface of the moveable funnel 28 in the contacting position are the same when viewed along the axis 300 of the fixed funnel 27. As a result, when the moveable funnel 28 is moved from the contacting position to the separated position (in the case that the engine 14 is rotating at high speed), the air entering the fixed funnel 27 having passed through the moveable funnel 28 is able to flow in a substantially linear manner. Accordingly, it is possible to inhibit flow resistance of the air from increasing.

In addition, in this embodiment, four of the moveable funnels 28 supported by the parallel linkage 42 are positioned at positions that correspond with the arrangement positions of the intake ports 17a when the motorcycle is viewed from the top side thereof, and the protrusions 25b are formed at positions that correspond with the arrangement positions of the four moveable funnels 28. As a result, the recess 12a can be formed in the fuel tank 12 linearly in alignment with the protrusions 25b of the air cleaner box 25. Thus, it is not necessary to make the shape of the recess 12a of the fuel tank 12, which is disposed at the portion corresponding to the protrusions 25b of the air cleaner box 25, complicated.

Further, in this embodiment, the resin cover 25a is provided so as to cover the front portion of the fuel tank 12 and the front side in the running direction of the motorcycle (the direction of the FWD arrow) of the air cleaner box 25 from the fuel tank 12. Accordingly, the air cleaner box 25 and the front portion of the fuel tank 12 can be easily protected.

Moreover, in this embodiment, the motor 45 that provides drive via the drive shaft 45a in order to move the moveable funnel 28 is disposed, with respect to the moveable funnel 28, at the opposite side to the fuel tank 12 that is disposed to the rear direction side in the running direction of the motorcycle (the direction of the FWD arrow) from the moveable funnel 28. As a result, as compared to when the motor 45 etc. for moving the moveable funnel 28 is disposed toward the fuel tank 12, the space on the fuel tank 12 side is increased, and this space can be used for disposing the fuel tank 12. As a result, the volume of the fuel tank 12 is inhibited from being reduced.

Note that, it is to be understood that all of the features of the embodiment disclosed here are merely examples, and in no way limit the invention. The scope of the invention is defined by the scope of the claims and not by the explanation of the above described embodiment. Further, the invention is understood to include structures that are equivalent in scope to the claims, and all modifications that come within the scope of the claims.

For example, in the example of the above embodiment the invention is applied to a motorcycle. However, the invention is not limited to this structure, and may be applied to vehicles other than a motorcycle.

Furthermore, in the above embodiment, the invention is applied to a vehicle equipped with an in-line 4-cylinder engine. However, the invention is not limited to this structure, and may be applied to a vehicle equipped with a multi-cylinder engine that is different to an in-line 4-cylinder engine, or applied to a vehicle equipped with a single cylinder engine. Further, the invention may be applied to a multi-cylinder engine that has a cylinder arrangement that is not in-line (for example, an engine in which the cylinders are in a V-arrangement).

Moreover, in the above embodiment, pairs of the moveable funnels are integrated. However, the invention is not limited to this structure and three or more of the moveable funnels may be integrated. Further, a separate moveable funnel may be provided for each cylinder.

In addition, the above embodiment has a structure in which the moveable funnels are caused to rise and fall by the parallel links (the link mechanism) having the plurality of the link levers. However, the invention is not limited to this structure and a link mechanism having a single arm (lever) may be used to make the moveable funnels rise and fall.

Further, the above embodiment describes an example in which two protrusions are formed separately. However, the invention is not limited to this structure, and two or more of the protrusions need not be formed. Instead, the protrusions may be integrated and a single protrusion provided. Alternatively, four protrusions may be provided for each of the cylinders.

What is claimed is:

1. A vehicle comprising:
an engine having at least one intake port;
a fixed funnel that delivers air to the intake port of the engine;
a moveable funnel positioned on the inlet side of the fixed funnel and that selectively cooperates with the fixed funnel to deliver air to the intake port of the engine;
a linkage that moveably supports the moveable funnel;
a case in which the fixed funnel and the moveable funnel are positioned, a portion of the case that covers the moveable funnel having a protrusion that defines a space sized and shaped to accommodate a portion of the moveable funnel such that contact between the case and the moveable funnel is prevented; and
a fuel tank that is rearward of the case and adjacent a portion of the case in which the moveable funnel is positioned, wherein the fuel tank having a recess sized and shaped to accommodate the protrusion of the case.

2. The vehicle according to claim 1, wherein a gap between adjacent portions of the fuel tank and the case is substantially constant in size.

3. The vehicle according to claim 1, further comprising a resin cover that is disposed so as to cover a portion of the fuel tank and a portion of the case.

4. The vehicle according to claim 3, wherein the resin cover is disposed so as to cover the gap formed between the fuel tank and the case.

5. The vehicle according to claim 3, wherein the resin cover is formed so as to be smoothly contiguous with a surface of a portion of the fuel tank that is not covered by the resin cover.

6. The vehicle according to claim 1, further comprising a drive source that drives the linkage in order to move the moveable funnel, the drive source being positioned on an opposite side of the movable funnel from the fuel tank.

7. A vehicle comprising:
an engine having at least one intake port;
a fixed funnel that delivers air to the intake port of the engine;
a moveable funnel positioned on the inlet side of the fixed funnel and that selectively cooperates with the fixed funnel to deliver air to the intake port of the engine;
a linkage that moveably supports the moveable funnel;
a case in which the fixed funnel and the moveable funnel are positioned, a portion of the case that covers the moveable funnel having a protrusion that defines a space sized and shaped to accommodate a portion of the moveable funnel such that contact between the case and the moveable funnel is prevented;
wherein the linkage is a parallel linkage that comprises a plurality of linkage members that support the moveable funnel such that it is capable of substantially parallel movement relative to the fixed funnel.

8. The vehicle according to claim 7, wherein when the engine is rotating at high speed, the linkage members rotate in a first direction to move the moveable funnel to a first position in which an outlet end of the moveable funnel is spaced from an inlet end of the fixed funnel, and when the engine is rotating at low speed, the linkage members rotate in a second direction opposite the first direction to move the moveable funnel to a second position in which the outlet end is in contact with the inlet end of the fixed funnel.

9. The vehicle according to claim 8, wherein an amount of rotation of the linkage members is adjusted such that the radial position of the outlet end of the moveable funnel in the first position is the same as the radial position of the outlet end of the moveable funnel in the second position relative to an axis defined by the inlet end of the fixed funnel.

10. The vehicle according to claim 7, wherein the at least one intake port comprises a plurality of intake ports, the intake ports arranged substantially along a line, wherein the fixed funnel and the moveable funnel are provided in plurality and one of each is associated with each of the plurality of intake ports, the plurality of movable funnels supported by the parallel linkage, each moveable funnel being located above a respective one of the intake ports, wherein the protrusion is formed at a position that corresponds with the positions at which the plurality of moveable funnels are provided.

11. The vehicle according to claim 10, wherein the plurality of intake ports are arranged in a vehicle width direction.

12. A vehicle comprising:
an engine having at least one intake port;
a fixed funnel that delivers air to the intake port of the engine;
a moveable funnel positioned on the inlet side of the fixed funnel and that selectively cooperates with the fixed funnel to deliver air to the intake port of the engine;
a linkage that moveably supports the moveable funnel;
a case in which the fixed funnel and the moveable funnel are positioned, a portion of the case that covers the moveable funnel having a protrusion that defines a space sized and shaped to accommodate a portion of the moveable funnel such that contact between the case and the moveable funnel is prevented;
a fuel tank that is rearward of the case and adjacent a portion of the case in which the moveable funnel is positioned, wherein the fuel tank having a recess sized and shaped to accommodate the protrusion of the case;
wherein the at least one intake port comprises a plurality of the intake ports, wherein the protrusion of the case is sized, shaped and located to accommodate the plurality of moveable funnels associated with the plurality of intake ports.

13. A vehicle comprising:
an engine having at least one combustion chamber;
an air intake arrangement associated with each of the combustion chambers and including an intake passage to deliver intake air to the combustion chamber, the air intake arrangement comprising at least one fixed funnel and at least one moveable funnel, the moveable funnel having a first position in which the moveable funnel is separated from the fixed funnel and a second position in which the moveable funnel and fixed funnel are coupled and cooperate to selectively vary a length of the intake passage;
a linkage that moveably supports the moveable funnel; and
an air cleaner box in which the fixed funnel and the moveable funnel are positioned, the air cleaner box having a generally planar wall portion adjacent the moveable funnel, the generally planar wall portion having at least one protrusion that defines a space sized and shaped to accommodate an upper end portion of the moveable funnel when the moveable funnel is in the second position.

14. The vehicle of claim 13, wherein the at least one combustion chamber comprises a plurality of combustion chambers, the at least one fixed funnel comprises a plurality of fixed funnels and the at least one moveable funnel comprises a plurality of moveable funnels, wherein one of the fixed funnels and one of the movable funnels are associated with each of the combustion chambers, wherein the at least one protrusion comprises a first protrusion and a second protrusion, the first protrusion accommodating a first portion of the moveable funnels and a second protrusion accommodating a second portion of the moveable funnels.

15. The vehicle of claim 14, wherein the first protrusion is separated from the second protrusion within the planar wall portion.

16. The vehicle of claim 15, wherein the first protrusion and the second protrusion are spaced on opposing lateral sides of a longitudinal center plane of the vehicle.

17. The vehicle of claim 13, further comprising a fuel tank having a portion adjacent the generally planar wall portion of the air cleaner box, a surface of the fuel tank defining a recess configured to accommodate the at least one protrusion.

18. The vehicle of claim 17, wherein a shape of the recess is complementary to a shape of the at least one protrusion.

* * * * *